US012761025B2

(12) United States Patent
Mookerjee et al.

(10) Patent No.: US 12,761,025 B2
(45) Date of Patent: Oct. 13, 2026

(54) CROSS-MODALITY SENSOR FUSION AND ERROR CORRECTION

(71) Applicant: Lockheed Martin Corporation, Bethesda, MD (US)

(72) Inventors: Purusottam Mookerjee, Bridgewater, NJ (US); Jacob Walter Dresher, Lawrence Township, NJ (US); R. Ryan Christopher Clement, Melbourne, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 19/097,699

(22) Filed: Apr. 1, 2025

(65) Prior Publication Data

US 2026/0309499 A1 Oct. 8, 2026

(51) Int. Cl.
*G01C 21/20* (2006.01)
*G01C 21/00* (2006.01)
*G01C 21/16* (2006.01)

(52) U.S. Cl.
CPC ........... *G01C 21/20* (2013.01); *G01C 21/005* (2013.01); *G01C 21/165* (2013.01)

(58) Field of Classification Search
CPC ..... G01C 21/20; G01C 21/005; G01C 21/165
See application file for complete search history.

(56) References Cited

U.S. PATENT DOCUMENTS

| | | | | |
|---|---|---|---|---|
| 6,459,990 | B1 * | 10/2002 | McCall | G01C 21/1654 73/178 R |
| 8,239,162 | B2 | 8/2012 | Tanenhaus | |
| 2006/0074558 | A1 * | 4/2006 | Williamson | G01S 19/15 342/357.56 |

FOREIGN PATENT DOCUMENTS

| | | | |
|---|---|---|---|
| CN | 108121890 | A | 6/2018 |
| CN | 108827299 | B | 4/2022 |
| CN | 112683267 | B | 6/2022 |
| WO | 2018214226 | A1 | 11/2018 |

OTHER PUBLICATIONS

Valenti et al., "A Linear Kalman Filter for MARG Orientation Estimation Using the Algebraic Quaternion Algorithm," IEEETransactions on Instrumentation and Measurement, vol. 65, No. 2, pp. 467-481, Feb. 2016 (15 pages).

(Continued)

*Primary Examiner* — Peter D Nolan
*Assistant Examiner* — Matthew Cobb
(74) *Attorney, Agent, or Firm* — Michael Best & Friedrich LLP

(57) ABSTRACT

A system includes two sensors of different modalities attached to a body and an electronic processor. The processor initializes a state model, applies a linear state estimator to linear components of the state model to determine an estimated angular velocity of the body, applies a kinematic model to quaternion components of the state model to determine an estimated quaternion, computes a transformation matrix based on the estimated quaternion, transforms modality-specific measurements from the second sensor into a navigation frame using the transformation matrix, and corrects the estimated quaternion to minimize an error between the transformed modality-specific measurement and a reference measurement.

20 Claims, 6 Drawing Sheets

(56) References Cited

OTHER PUBLICATIONS

Crassidis et al., "Survey of Nonlinear Attitude Estimation Methods," Journal of Guidance, Control, and Dynamics,vol. 30, No. 1. Jan.-Feb. 2007 (48 pages).
Guo et al., "Novel MARG-Sensor Orientati on Esti mati on Using Fast Kalman Filter," Hindawi, Journal of Sensors, published Sep. 24, 2017, Article ID 8542153 (12 pages).
Madgwick et al., "Estimation of IMU and MARG orientation using a gradient descent algorithm," 2011 IEEE Internati onal Conference on Rehabilitation Roboti cs, Jun. 29-Jul. 1, 2011, pp. 179-185 (7 pages).
Madgwick et al., "An Extended Complementary Filter for Full-Body MARG Orientation Estimation," IEEE/ASME Transacti ons on Mechatronics, vol. 25, No. 4, Aug. 2020, pp. 2054-2064 (11 pages).
Sabatini et al., "Quaternion-Based Extended Kalman Filter for Determining Orientation by Inertial and Magnetic Sensing," IEEE Transactions on Biomedical Engineering, vol. 53, No. 7, pp. 1346-1356, Jul. 2006 (11 pages).
Wahba, G., "A Least Squares Estimate of Satellite Attitude," SIAM Review, vol. 8, No. 3, pp. 384-386, Jul. 1966 (4 pages).
Wilson et al., "Formulation of a new gradient descent MARG orientation algorithm: case study on robot teleoperation," Mechanical Systems and Signal Processing, vol. 130, pp. 183-200, Sep. 1, 2019 (18 pages).
Wu et al., "Fast Complementary Filter for Attitude Estimation Using Low-Cost MARG Sensors," IEEESensors Journal, vol. 16, No. 18, Sep. 15, 2016 (11 pages).
Wu et al., "Fast Linear Quaternion Attitude Estimator Using Vector Observations," IEEETransactions on Automation Science and Engineering, vol. 15, No. 1, pp. 307-319, Jan. 2018 (12 pages).
Wu et al., "Generalized Linear Quaternion Complementary Filter for Attitude Estimation From Multi sensor Observations: An Optimization Approach," IEEE Transactions on Automation Science and Engineering, vol. 16, No. 3, pp. 1330-1343, Jul. 2019 (14 pages).
Wu, "MARG Attitude Estimati on Using Gradient-Descent Linear Kalman Filter," IEEE Transactions on Automation Science and Engineering, vol. 17, No. 4, pp. 1777-1790, Oct. 2020 (14 pages).
Dresher et al., "Orientation Estimation Based on a Gyro Kalman Filter and Nonlinear Optimization", Accessed Jan. 10, 2025 (39 pages).
Simres Breaking New Ground in Force-on-Force Trainin, Lockheed Martin, <https://www.lockheedmartin.com/en-us/products/simres.html>, Publicly available as early as Dec. 13, 2023 (5 pages).

* cited by examiner

CROSS-MODALITY SENSOR FUSION AND ERROR CORRECTION

FIELD

The present disclosure relates to sensor fusion and error correction and, more particularly, to sensor fusion and error correction techniques that implement linear approaches.

SUMMARY

Navigation systems utilize sensors—such as gyroscopes—or sensor suites such as magnetic, angular rate, and gravity (MARG) suites—which include gyroscopes—to estimate the orientation of a moving body. At each time step, these sensors may measure the body's instantaneous angular velocity along multiple axes, capturing the body's rotational motion. By integrating these angular velocity measurements over time, the system estimates the body's orientation at the current time step relative to a known initial orientation. Technical solutions described herein address various technical challenges described below through a correction step, which may be, for example, based on a minimization problem using Lagrange multipliers, incorporating measurements from the magnetometer, accelerometer, and/or their respective cross product.

While precise, gyroscopes may be prone to measurement errors, including bias, noise, scale factor inaccuracies, etc. Over time, these errors may accumulate as the system integrates angular velocity to estimate the orientation, potentially leading to a phenomenon known as drift. Since integration sums even small errors at each time step, the estimated orientation may gradually deviate from the true orientation. This drift may be particularly problematic in long-duration operations where no external reference is available to correct the accumulated error.

Real-world motion dynamics, sensor behavior, and error sources tend to be nonlinear due to the complexity of rotational motion, sensor response characteristics, and external environmental influences. The orientation of a body in three-dimensional space may be governed by nonlinear differential equations, such as those describing quaternion or Euler angle kinematics. Rotational motion may involve noncommutative transformations, meaning that angular displacements may not simply add linearly but may need to be integrated in a nonlinear manner to correctly track orientation.

Additionally, sensors such as gyroscopes measure angular velocity rather than absolute orientation, potentially requiring numerical integration over time to estimate orientation. However, this integration may tend to introduce cumulative nonlinear error propagation, as even small measurement errors may compound exponentially over successive time steps. Gyroscope bias is a stochastic process that may contribute to the uncertainty of gyroscope measurements.

Because motion dynamics, sensor behavior, and error sources tend to be nonlinear, nonlinear estimation techniques—such as, for example, Extended Kalman Filters (EKFs), particle filters, etc.—are often be used to model real-world motion dynamics. However, these nonlinear estimation techniques may involve complex and computationally expensive calculations. For example, the EKF relies on repeated Jacobian matrix calculations, which may involve computationally expensive partial differentiation of system equations, as well as matrix multiplications and inversions at each update step. The particle filter relies on Monte Carlo sampling, where thousands or even millions of particles may need to be propagated, weighted, and resampled in real time. More generally, nonlinear methods may involve probability density function evaluations, nonlinear transformations, and stochastic resampling, all of which may require substantial processing power.

The need for substantial processing power may make nonlinear methods challenging to implement in power- and computation-constrained applications. One such application may be lightweight unmanned aerial vehicles (UAVs), where battery capacity is important design factor. The energy consumption of onboard computational processes may directly impact flight time, as heavier batteries provide more energy but increase weight, potentially reducing aerodynamic efficiency. Thus, in lightweight UAVs, minimizing mass may be beneficial for maximizing endurance, maneuverability, and payload capacity. However, reducing weight may also limit the size of the onboard power source, potentially restricting the computational capabilities available for real-time orientation estimation. Given these constraints, there is a need for computationally efficient orientation estimation techniques that balance accuracy with minimal processing overhead.

Linear estimation techniques, such as the Linear Kalman Filter (KF), are computationally efficient because they rely on linear system models, which allows for efficient matrix multiplications, additions, and inversions. These operations tend to have significantly lower computational overhead compared to nonlinear methods. Thus, the computational efficiency of Linear Kalman Filters may make them attractive for real-time embedded applications, especially in power- and resource-constrained systems such as lightweight UAVs.

However, implementing linear or linearization techniques for orientation estimation—such as, for example, locally linearizing about a vector using a Taylor expansion—is technically challenging because real-world motion dynamics, sensor behaviors, and error sources tend to be—for example, as previously explained—nonlinear. For example, it may be technically challenging to model rotational motion within a linear state-space framework. Rotation in three-dimensional space may follow noncommutative transformations, meaning that angular displacements may not simply add linearly and may need to be integrated through trigonometric or quaternion-based nonlinear equations. Because Linear Kalman Filters may assume a constant relationship between state variables, it may be technically challenging for Linear Kalman Filters to account for the complex interactions between angular velocity, orientation, and sensor noise, potentially leading to poor estimation accuracy.

Despite these technical challenges, the problem can be overcome by a two-stage approach that combines linear filtering and nonlinear optimization, as will be explained herein. In the first stage, a linear filter—such as a Linear Kalman Filter—may be applied to gyroscope measurements to estimate angular velocity. The estimated angular velocity may be integrated to approximate orientation. To address errors that may accumulate over time in the orientation estimates, a secondary stage may perform nonlinear optimization using measurements from the accelerometer, magnetometer, and/or their respective cross product.

Systems, methods, apparatus, and techniques described herein may address the previously described technical challenges by implementing a fully linear approach to orientation estimation by applying a linear Kalman filter to estimate angular velocity and propagating orientation using quaternion-based kinematics, which may follow, for example, a linear differential equation. Unlike nonlinear estimation methods, such as Extended Kalman Filters (EKFs) or Unscented Kalman Filters (UKFs), this approach does not require computationally expensive nonlinear transformations, Jacobian matrix calculations, or Monte Carlo sampling. Instead, the system may update orientation using a computationally efficient algebraic correction step that refines the estimated quaternion based on secondary sensor measurements.

To mitigate error accumulation and drift, sensor fusion may incorporate measurements from secondary sensors, such as magnetometers and accelerometers. These measurements may be transformed from the body frame into the navigation frame using a transformation matrix derived from the estimated quaternion. By computing an error metric based on the difference between the transformed measurement and a known reference value, the system may iteratively adjust the quaternion estimate to reduce orientation errors. Because this correction step can be performed algebraically (e.g., through an error minimization process), rather than through nonlinear filtering techniques, the approach maintains computational efficiency while preserving estimation accuracy over time.

Thus, the described techniques may provide significant technical advantages in power- and resource-constrained applications, such as lightweight UAVs, where computational efficiency may directly impact flight time and operational performance. By maintaining a fully linear processing framework, the system supports real-time, low-power orientation estimation, making it well-suited for embedded navigation systems. Additionally, by avoiding the high computational burden associated with nonlinear estimation methods, the system may extend operational endurance while providing robust orientation tracking in real-world conditions.

The described advancements in sensor fusion systems may be particularly beneficial in applications where size, weight, power, and cost (SWaP-C) constraints are among the most stringent in the commercial marketplace. These constraints may be especially critical in small UAV/unmanned aerial system (UAS) platforms and wearable devices, where computational efficiency needs to be maximized within severe power limitations. In such systems, a microcontroller is often selected over a microprocessor due to its lower power consumption, facilitating continuous operation without excessive energy demands. In UAV/UAS applications, where real-time orientation updates may be crucial for stability and maneuverability, computations may need to be executed at frequencies exceeding 1 kHz to ensure precise control during rapid movements. Similarly, in wearable medical devices, accurate motion tracking may support physical therapy monitoring, such as tracking prescribed leg extensions following knee surgery, facilitating remote assessment and feedback by medical professionals. Another notable application is in gaming systems, where real-time motion capture enhances user interaction. A compact, lightweight, and power-efficient device can track a player's movements with minimal battery consumption, transmitting orientation data to a gaming console for an immersive experience. The fusion of efficient orientation estimation techniques with SWAP-C-optimized hardware supports these diverse applications by delivering accurate, low-latency motion tracking in power- and resource-constrained environments.

According to some examples, a system includes a first sensor coupled to a body, a second sensor coupled to the body, non-transitory computer-readable storage media storing instructions, and an electronic processor. The first sensor has a first modality. The second sensor has a second modality. The second modality is different from the first modality. The electronic processor is configured to execute the instructions to initialize a state model, the state model including (i) linear components representing an instantaneous rate of rotation of the body and (ii) quaternion components representing a current orientation of the body, and apply a linear state estimator to the linear components of the state model based on first sensor signals from the first sensor to determine an estimated angular velocity of the body.

The electronic processor is further configured to execute the instructions to apply a kinematic model to the quaternion components of the state model to determine an estimated quaternion, the estimated quaternion representing an orientation of the body in a body frame, compute a transformation matrix based on the estimated quaternion, the transformation matrix being usable to transform representations from the body frame to a navigation frame, and determine a modality-specific measurement based on second sensor signals from the second sensor.

The electronic processor is further configured to execute the instructions to transform the modality-specific measurement from the body frame into the navigation frame using the transformation matrix, compute an error between the transformed modality-specific measurement and a reference measurement, the reference measurement being in the navigation frame, and correct the estimated quaternion to minimize the error, the corrected quaternion representing a corrected orientation of the body.

In other features, the linear state estimator is a Linear Kalman Filter. In other features, the kinematic model includes integrating a differential equation of the quaternion components using the estimated angular velocity. In other features, the linear components of the state model represent instantaneous rates of rotation in three axes of the body. In other features, the first sensor includes a gyroscope.

In other features, the second sensor includes a magnetometer, the modality-specific measurement includes a magnetic field vector, and the reference measurement includes a reference magnetic field vector in the navigation frame. In other features, the second sensor includes an accelerometer, the modality-specific measurement includes a gravity vector, and the reference measurement includes a reference gravity vector in the navigation frame.

Other examples provide a system that includes a first sensor coupled to a body, a second sensor coupled to the body, the second modality being different from the first modality, a third sensor coupled to the body, non-transitory computer-readable storage media storing instructions, and an electronic processor. The first sensor has a first modality. The second sensor has a second modality. The third sensor has a third modality. The third modality is different from the first modality and the second modality. The electronic processor is configured to execute the instructions to initialize a state model, the state model including (i) linear components representing an instantaneous rate of rotation of the body and (ii) quaternion components representing a current orientation of the body, and apply a linear state estimator to the linear components of the state model based on first sensor signals from the first sensor to determine an estimated angular velocity of the body.

The electronic processor is further configured to execute the instructions to apply a kinematic model to the quaternion components of the state model to determine an estimated quaternion, the estimated quaternion representing an orientation of the body in a body frame, compute a transformation matrix based on the estimated quaternion, the transformation matrix being usable to transform representations from the body frame to a navigation frame, determine a first modality-specific measurement based on second sensor signals from the second sensor, determine a second modality-specific measurement based on third sensor signals from the third sensor, and compute a cross-product of the first modality-specific measurement and the second modality-specific measurement.

The electronic processor is further configured to execute the instructions to transform the cross-product of the first modality-specific measurement and the second modality-specific measurement from the body frame into the navigation frame using the transformation matrix, compute a reference cross-product of a first reference measurement and a second reference measurement, the first reference measurement and the second reference measurement being in the navigation frame, compute an error between the transformed cross-product and the reference cross-product, and correct the estimated quaternion to minimize the error, the corrected quaternion representing a corrected orientation of the body.

In other features, the linear state estimator is a Linear Kalman Filter. In other features, the kinematic model includes integrating a differential equation of the quaternion components using the estimated angular velocity. In other features, the linear components of the state model represent instantaneous rates of rotation in three axes of the body. In other features, the first sensor includes a gyroscope.

In other features, the second sensor includes a magnetometer, the first modality-specific measurement includes a magnetic field vector, and the first reference measurement includes a reference magnetic field vector in the navigation frame. In other features, the third sensor includes an accelerometer, the second modality-specific measurement includes a gravity vector, and the second reference measurement includes a reference gravity vector in the navigation frame.

Other examples provide a method that includes initializing, at a sensor platform, a state model, the state model including (i) linear components representing an instantaneous rate of rotation of the sensor platform and (ii) quaternion components representing a current orientation of the sensor platform, and applying, at the sensor platform, a linear state estimator to the linear components of the state model based on first sensor signals from a first sensor to determine an estimated angular velocity of the sensor platform, the first sensor being coupled to the sensor platform, the first sensor having a first modality.

The method further includes applying, at the sensor platform, a kinematic model to the quaternion components of the state model to determine an estimated quaternion, the estimated quaternion representing an orientation of the sensor platform in a body frame, computing, at the sensor platform, a transformation matrix based on the estimated quaternion, the transformation matrix being usable to transform representations from the body frame to a navigation frame, and computing, at the sensor platform, a modality-specific measurement based on second sensor signals from a second sensor, the second sensor being coupled to the sensor platform, the second sensor having a second modality different from the first sensor.

The method further includes transforming, at the sensor platform, the modality-specific measurement from the body frame into the navigation frame using the transformation matrix, computing, at the sensor platform, an error between the transformed modality-specific measurement and a reference measurement, the reference measurement being in the navigation frame, and correcting, at the sensor platform, the estimated quaternion to minimize the error, the corrected quaternion representing a corrected orientation of the sensor platform.

In other features, the linear state estimator is a Linear Kalman Filter, the kinematic model includes integrating a differential equation of the quaternion components using the estimated angular velocity, and the linear components of the state model represent instantaneous rates of rotation in three axes of the body. In other features, the first sensor includes a gyroscope.

In other features, the second sensor includes a magnetometer, the modality-specific measurement includes a magnetic field vector, and the reference measurement includes a reference magnetic field vector in the navigation frame. In other features, the second sensor includes an accelerometer, the modality-specific measurement includes a gravity vector, and the reference measurement includes a reference gravity vector in the navigation frame.

Other examples provide a non-transitory computer-readable storage medium that includes executable instructions that, when executed by an electronic processor, causes the electronic processor to initialize, at a sensor platform, a state model, the state model including (i) linear components representing an instantaneous rate of rotation of the sensor platform and (ii) quaternion components representing a current orientation of the sensor platform, and apply, at the sensor platform, a linear state estimator to the linear components of the state model based on first sensor signals from a first sensor to determine an estimated angular velocity of the sensor platform, the first sensor being coupled to the sensor platform, the first sensor having a first modality.

When executed by the electronic processor, the executable instructions further cause the electronic processor to apply, at the sensor platform, a kinematic model to the quaternion components of the state model to determine an estimated quaternion, the estimated quaternion representing an orientation of the sensor platform in a body frame, compute, at the sensor platform, a transformation matrix based on the estimated quaternion, the transformation matrix being usable to transform representations from the body frame to a navigation frame, compute, at the sensor platform, a modality-specific measurement based on second sensor signals from a second sensor, the second sensor being coupled to the sensor platform, the second sensor having a second modality different from the first sensor, When executed by the electronic processor, the executable instructions further cause the electronic processor to transform, at the sensor platform, the modality-specific measurement from the body frame into the navigation frame using the transformation matrix, compute, at the sensor platform, an error between the transformed modality-specific measurement and a reference measurement, the reference measurement being in the navigation frame, and correct, at the sensor platform, the estimated quaternion to minimize the error, the corrected quaternion representing a corrected orientation of the sensor platform.

Other examples, embodiments, features, and aspects will become apparent by consideration of the detailed description and accompanying drawings.

BRIEF DESCRIPTION OF THE DRAWINGS

In the drawings, reference numbers may be reused to identify similar and/or identical elements.

DETAILED DESCRIPTION

Figure 1:
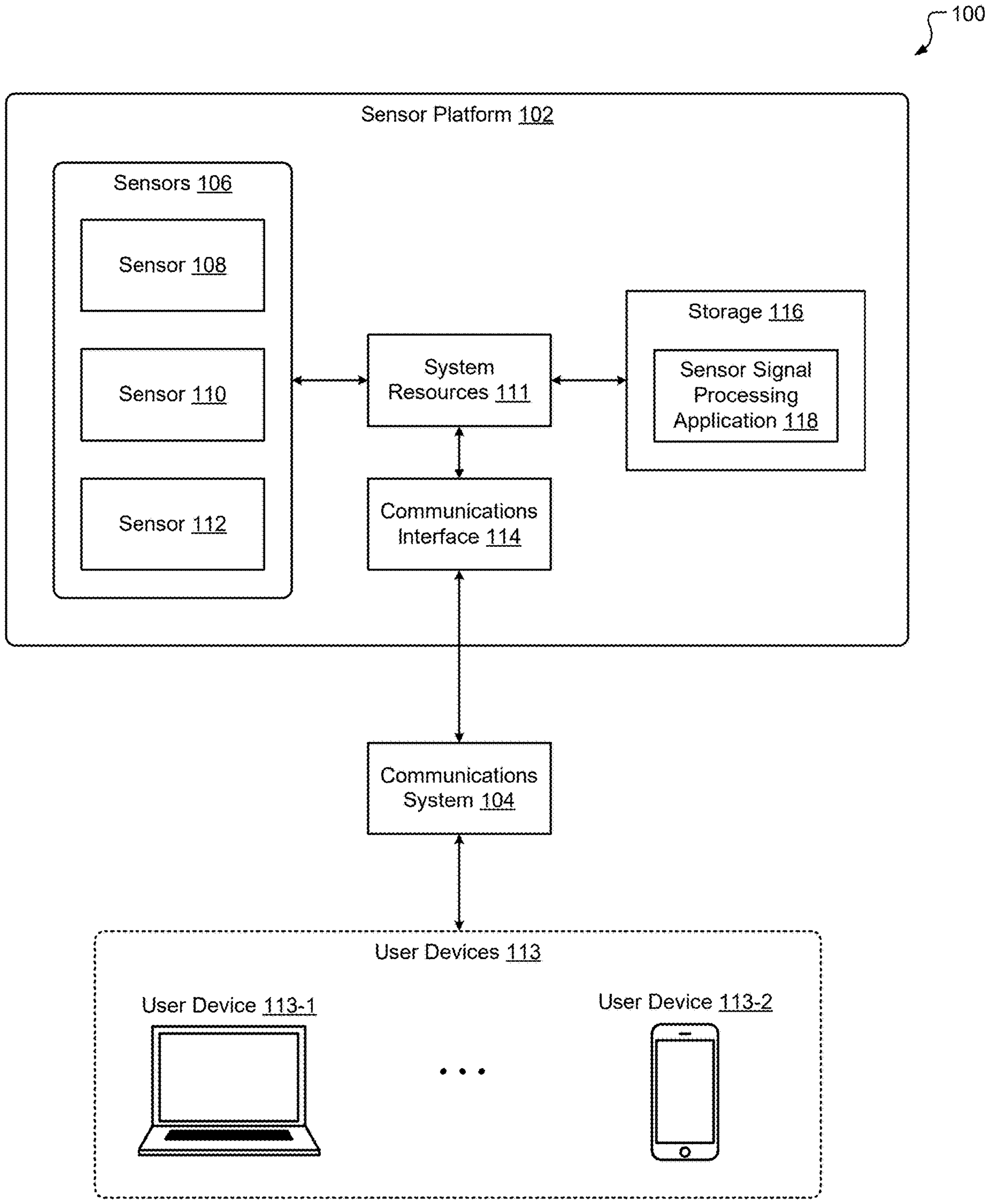
FIG. 1 is a block diagram illustrating a sensor system, according to some examples.

FIG. 1 is a block diagram illustrating a sensor system 100, according to some examples. In the example of FIG. 1, the system 100 includes a sensor platform 102, a communications system 104, and one or more user device 113 (such as the user device 113-1 and the user device 113-2). Although a single sensor platform 102, a single communications system 104, and two user device 113 are illustrated in the example of FIG. 1, other implementations of the system 100 include any number of platforms, systems, devices, etc., as may be suitable for the particular application. In some examples, one or more of the platforms, systems, devices, etc. may be omitted from the system 100 as appropriate.

The sensor platform 102 may include a body, such as a UAV, robotic system, autonomous vehicle, wearable device, or any other mobile or stationary system, implemented with one or more sensors to capture motion-related data (such as, for example, angular velocity, acceleration, orientation, etc.) to support real-time or near-real-time navigation and tracking, etc. The sensor platform 102 may communicate with one or more user device 113 via the communications system 104.

The communications system 104 may facilitate data transmission and connectivity between the sensor platform 102 and one or more user devices 113. In various implementations, the communications system 104 includes wired and wireless communication networks, allowing for real-time or near-real-time data exchange across different infrastructures. Depending on the application, the communications system 104 may support mobile communication technologies, Internet-based networks, short-range wireless protocols, serial communication interfaces, etc., ensuring reliable data transfer in various operational environments.

For short-range communication, the communications system 104 may include Wi-Fi (IEEE 802.11) and Bluetooth, allowing the sensor platform 102 to exchange data directly with the user devices 113. In some examples, the communications system 104 incorporate radio frequency (RF) links operating in the 2.4 GHz or 5.8 GHz bands, providing wireless control and/or telemetry between the sensor platform 102 and the user devices 113, such as ground control stations. The MAVLink protocol may be used over serial communication (e.g., UART, USB) or RF links to facilitate structured data exchange between the sensor platform 102 and the user device 113.

For medium-range communication, the communications system 104 may implement LoRa (Long Range) technology, a low-power wide-area network (LPWAN) protocol suitable for transmitting telemetry data from the sensor platform 102 over extended distances with minimal power consumption. Additionally, telemetry radio links in the 915 MHz, 433 MHz, 2.4 GHz, or 5.8 GHz bands may be used to send real-time sensor data to user devices 113 for monitoring and control. In certain implementations, multiple instances of the sensor platform 102 may communicate with each other using mesh networks, where data is relayed between platforms to extend connectivity and enhance operational range.

For long-range and Beyond Visual Line of Sight (BVLOS) communication, the communications system 104 may include cellular networks (4G LTE, 5G) to facilitate data transmission between the sensor platform 102 and user devices 113 over existing mobile infrastructures. This allows for remote monitoring and control of the sensor platform 102 even when operating over large distances. In some implementations, the communications system 104 incorporates satellite communication (SATCOM) via networks such as Iridium and Inmarsat, enabling global connectivity in environments where terrestrial networks are unavailable. Additionally, high-frequency (HF), very high-frequency (VHF), and/or ultra-high-frequency (UHF) radio links may be used in specialized applications to maintain communication between the sensor platform 102 and user devices 113 over long distances.

In some examples, the communications system 104 also include wired or optical networks, such as local area networks (LANs) or the Internet, to facilitate high-speed data transfer between the sensor platform 102 and user devices 113. The communications system 104 may support various serial communication protocols, including RS-232, RS-485, Universal Asynchronous Receiver/Transmitter (UART), Inter-Integrated Circuit ($I^2C$), and Serial Peripheral Interface (SPI), to facilitate direct data exchange between components within the sensor platform 102. Additionally or alternatively, Universal Serial Bus (USB) interfaces may be used for high-speed wired communication in embedded systems. In various implementations, the communications system 104 incorporates a Controller Area Network (CAN) bus, which may be particularly useful when the sensor platform 102 consists of multiple interconnected subsystems requiring efficient, real-time data exchange.

By integrating multiple communication technologies, the communications system 104 may dynamically select the most appropriate method for data transmission based on range, power constraints, and environmental conditions. Hybrid communication architectures may combine RF, Wi-Fi, LTE/5G, SATCOM, and/or other modalities to ensure continuous data exchange between the sensor platform 102 and user devices 113, even in environments with fluctuating signal quality. These multi-link systems may enhance reliability, particularly for sensor platforms 102 operating in remote, urban, or high-interference environments, where redundancy and failover mechanisms may be technically beneficial for maintaining connectivity.

The user devices 113 may be implemented as various types of computing or display systems, depending on the nature of the sensor platform 102 and the intended application. In various implementations, user devices 113 include ground control stations, mobile devices, computers, augmented reality (AR) and/or virtual reality (VR) headsets, wearable devices, cloud-based processing systems, etc. The user devices 113 may receive and process data from the sensor platform 102 via the communications system 104, and provide users with real-time or near-real-time telemetry, visualization, control interfaces, analytical insights, etc., and/or provide other data processing functions related to the sensor platform 102.

The sensor platform 102 may generate telemetry indicative of its orientation, which is then transmitted to the user devices 113. In various implementations, orientation includes the angular position of the sensor platform 102 relative to a fixed reference frame, typically defined in terms of pitch, roll, and yaw angles or represented using quaternions or Euler angles in three-dimensional space. In some examples, the telemetry includes measurements of angular velocity, acceleration, and/or absolute orientation, allowing external systems to interpret the position and/or movement of the sensor platform 102 with respect to its surroundings. Accurately determining orientation may be technically advantageous for various applications, facilitating navigation, motion tracking, stability control, and situational awareness. The user devices 113 may interpret the telemetry in real-time or near-real-time to facilitate decision-making, automate control mechanisms, or enhance user interaction with the system.

In examples where the sensor platform 102 is implemented as a UAV, orientation telemetry may be used for attitude stabilization, waypoint navigation, and autonomous flight control. User devices 113 such as ground control stations (GCS), handheld controllers, or remote monitoring terminals may display real-time UAV orientation, allowing operators to monitor pitch, roll, and yaw. In autonomous UAV systems, orientation data may be important for collision avoidance, terrain mapping, and formation flying. User device 113 may include advanced user interfaces may incorporate augmented reality (AR) headsets or virtual reality (VR) systems, providing immersive piloting experiences and enhancing first-person view (FPV) drone operations.

When the sensor platform 102 is implemented as a robotic system, orientation telemetry may play an important role in motion planning, balance control, environmental interaction, etc. User devices 113, such as, for example, remote control terminals, supervisory control interfaces, cloud-based dashboards, etc. may process this telemetry to coordinate robotic movement in industrial automation, medical robotics, search-and-rescue applications, etc. In collaborative robotics, wearable controllers or gesture-based interfaces may use real-time orientation data to facilitate precise and intuitive control over robotic platforms. In fully autonomous robotic systems, orientation estimation supports path optimization, robotic arm articulation, and obstacle avoidance, ensuring efficient execution of tasks in warehouse logistics, manufacturing, or hazardous environments.

In implementations where the sensor platform 102 is an autonomous vehicle, orientation telemetry may be used for stability, trajectory planning, maneuvering, etc. The user devices 113 in these applications may include fleet management dashboards, operator consoles, vehicle-mounted displays, etc., which may visualize vehicle orientation and other related data. This information is particularly useful for advanced driver assistance systems (ADAS), unmanned ground vehicles (UGVs), and maritime navigation systems, where precise orientation tracking may facilitate safe and reliable operation. In defense applications, user devices 113 such as command center interfaces may receive secure telemetry feeds, allowing for real-time or near-real-time mission planning, coordination of multiple autonomous vehicles in complex operational environments, etc.

When the sensor platform 102 is implemented as a wearable device, orientation telemetry may enhance motion tracking, biometric monitoring, and augmented navigation. User devices 113 such as smartphones, smartwatches, AR headsets, etc. may analyze this telemetry to provide real-time feedback on posture, gait, and movement patterns. In medical and rehabilitation applications, orientation tracking may assist in physical therapy progress monitoring, prosthetic control, and exoskeleton-assisted movement. In military or tactical settings, helmet-mounted displays may use orientation data to overlay navigation cues, situational awareness indicators, and target tracking information, assisting users in complex and dynamic environments.

Across the various implementations of the system 100, the accuracy of orientation telemetry may be important for ensuring stable navigation, precise control, reliable motion tracking, etc. Errors in orientation estimation—such as those caused by sensor drift, noise, or environmental interference—may introduce deviations from intended trajectories, instability in control systems, or inaccurate system responses. These errors may be particularly problematic in real-time or near-real-time applications, where precise orientation data may be important for autonomous operation, decision-making, and user interaction. By implementing high-fidelity, self-correcting orientation tracking, the sensor platform 102 may mitigate the accumulation of errors over time, enhancing efficiency, safety, and responsiveness. This improved accuracy allows the user devices 113 to process orientation telemetry with increased confidence, allowing for improved system performance across a wide range of applications.

In the example of FIG. 1, the sensor platform 102 includes one or more sensors 106, such as, for example, a sensor 108, a sensor 110, and a sensor 112. In various implementations, the sensors 106 may each have a different sensing modality, facilitating multi-sensor fusion for improved orientation estimation. For example, the sensor 108 may be a gyroscope, the sensor 110 may be a magnetometer, and the sensor 112 may be an accelerometer. Together, these sensors may form a magnetic, angular rate, and gravity (MARG) suite, for example, in an inertial measurement unit (IMU) for estimating the orientation of the sensor platform 102 relative to a fixed reference frame. In other implementations, different combinations or numbers of sensors 106 may be included, depending on the requirements of the sensor platform 102. For example, in some implementations, the sensors 106 may include only two sensors, such as sensor 108 and sensor 110. In other examples, additional sensors and/or types of sensors may be included.

A gyroscope may measure the angular velocity of the sensor platform 102, allowing for real-time tracking of rotational motion. In various implementations, the sensor 108 is configured as a microelectromechanical system (MEMS) gyroscope, a fiber-optic gyroscope (FOG), a ring laser gyroscope (RLG), or a hemispherical resonator gyroscope (HRG). MEMS gyroscopes, characterized by their compact size, low weight, and energy efficiency, may be beneficial in applications with size, weight, and power constraints. FOG gyroscopes detect rotation by analyzing the interference of light traveling through an optical fiber, providing higher stability and precision with reduced long-term drift. RLG gyroscopes, which operate using two counter-propagating laser beams in a closed-loop optical path, offer accuracy and robustness for extended-duration operations. HRG gyroscopes rely on a vibrating hemispherical resonator to measure angular motion, exhibiting long-term stability and resistance to environmental variations.

A magnetometer may measure the local magnetic field vector at the sensor platform 102. The sensor 110 may be implemented as a one-, two-, or three-axis magnetometer. Suitable types of magnetometers include fluxgate magnetometers, optically pumped magnetometers, Overhauser magnetometers, proton precession magnetometers, and Hall effect magnetometers. Fluxgate magnetometers offer high sensitivity and low noise, allowing for detection of small variations in magnetic fields. Optically pumped magnetometers utilize quantum effects to achieve high-resolution magnetic field measurements with minimal drift, ensuring greater long-term stability. Overhauser magnetometers use radiofrequency excitation to allow for low-power magnetic field measurements. Proton precession magnetometers detect variations in the Earth's magnetic field by measuring the precession frequency of protons in a fluid. Hall effect magnetometers rely on semiconductor materials to measure magnetic field strength based on voltage differentials.

An accelerometer may measure linear acceleration at the sensor platform 102. The sensor 112 may be implemented as either a one-, two-, or three-axis accelerometer. Suitable types of accelerometers include MEMS accelerometers, piezoelectric accelerometers, servo (force-balance) accelerometers, variable capacitance accelerometers, and resonant beam accelerometers. MEMS accelerometers use microscale capacitive or piezoresistive sensing elements to measure acceleration. Piezoelectric accelerometers leverage piezoelectric materials to generate an electrical charge in response to mechanical stress. Servo (force-balance) accelerometers employ a closed-loop feedback system to counteract detected acceleration. Variable capacitance accelerometers detect acceleration by measuring capacitance changes between moving and stationary plates. Resonant beam accelerometers determine acceleration through shifts in the resonant frequency of a microfabricated beam.

The sensor platform 102 may include system resources 111, a communications interface 114, non-transitory computer-readable storage media, such as, for example, storage 116. The non-transitory computer-readable storage media may contain instructions that, when executed, cause one or more electronic processors (such as, for example, electronic processors of the system resources 111) to perform various functions described herein. The system resources 111 may include one or more electronic processors (such as, for example, microprocessors, microcontrollers, etc.), one or more graphics processing units, volatile computer memory, non-volatile computer memory, and/or one or more system buses interconnecting various components of the sensor platform 102. The communications interface 114 may include hardware and/or software components that communicate with other devices, platforms, and/or systems over the communications system 104. In various implementations, the communications interface 114 includes one or more transceivers for sending and/or receiving data over the communications system 104.

The storage 116 may store a sensor signal processing application 118. As described in detail herein, the sensor signal processing application 118 may process sensor signals from the sensor 108 to generate an orientation estimate and apply corrections based on sensor signals from one or more of the sensors 110 and 112. The corrected orientation may then be transmitted to the user devices 113 via the communications system 104. The user devices 113 may utilize the corrected orientation for any of the previously described applications, as well as other functions that depend on accurate orientation tracking.

Generally, the sensors 106 may measure physical variables relative to the inertial reference frame and express these measurements in their respective sensor frames. The sensor signals may be processed and transformed into a unified reference frame by the sensor signal processing application 118, allowing for accurate orientation estimation.

For example, the sensor 108 may be implement as a gyroscope attached to the sensor platform 102. The sensor 108 may measure the angular velocity of the sensor platform 102 relative to the inertial reference frame, initially expressing these measurements in the gyroscope's frame. The sensor signal processing application 118 may transforms these angular velocity measurements into the body frame using the calibration matrix $$R_G^B.$$

In examples implementing an identity calibration matrix, the gyroscope's frame may be considered equivalent to the body frame, simplifying the transformation. In discrete time $t_k$, the gyroscope measures the angular velocity $$\omega_{NB}^B$$

of the body to which the gyroscope is attached, which may be modeled according to Equation (1):

$$z_G(k) = \omega_{NB}^B(k) + v_G(k) \tag{1}$$

In Equation (1), $v_G(k)$ represents Gaussian white noise with variance $$\sigma_{v_G}^2.$$

In various implementations, the sensor 112 is implemented as an accelerometer attached to the sensor platform 102. The sensor 112 may measure the kinematic acceleration of the sensor platform 102, for example, capturing the combined effects of proper acceleration, gravitational acceleration, and, depending on motion conditions, Coriolis acceleration. The sensor signal processing application 118 may the raw accelerometer signals by transforming them into the body frame, accounting for any necessary reference frame adjustments. The accelerometer measurement $z_A(k)$ may be modeled according to Equation (2):

$$z_A(k) = a_{CP}(k) + a_{CO}(k) - a_G(k) + v_A(k) \tag{2}$$

In Equation (2), $a_{CP}(k)$ represents proper acceleration, $a_{CO}(k)$ accounts for Coriolis acceleration, $a_G(k)$ represents gravitational acceleration, and $v_A(k)$ is Gaussian white noise with variance $$\sigma_{v_A}^2.$$

For the motion considered in this example, $a_{CO}(k)=0$, simplifying the model.

In some examples, the sensor 110 is implemented as a magnetometer attached to the sensor platform 102. The sensor 110 may measure the Earth's magnetic field as represented in the body frame, providing absolute orientation reference data. The raw magnetometer readings are transformed from the sensor frame into the body frame by the sensor signal processing application 118. The magnetometer measurement $z_M(k)$ may be according to Equation (3):

$$z_M(k) = m_E^B(k) + v_M(k) \tag{3}$$

In Equation (3), where $$m_E^B(k)$$

represents the Earth's magnetic field vector in the body frame, and $v_M(k)$ is Gaussian white noise with variance $$\sigma_{v_M}^2.$$

In various implementations, the sensor signal processing application 118 applies the transformations described with reference to Equations (1)-(3) to ensure that all sensor measurements are expressed in the appropriate reference frame, facilitating accurate orientation estimation. By unifying the data from the gyroscope, accelerometer, and magnetometer within the body frame, the sensor signal processing application 118 establishes a consistent basis for further processing, sensor fusion, orientation tracking, etc. (as may be appropriate for the particular application).

In various implementations, the sensor signal processing application 118 may process sensor signals from the sensor 108 to establish a state model representing both the rate of rotation of a body and its orientation. For example, the sensor 108 may be an accelerometer, which may measure angular rotation about one or more axes. In some examples, the sensor 108 may measure angular velocity in a body frame defined by an x-axis, y-axis, and z-axis. The measured angular velocity may be expressed as an angular velocity vector $$\omega_{NB}^B,$$

which represents the angular velocity of the body with respect to the navigation frame ENU, expressed in the body frame XYZ, according to Equation (4):

$$\omega_{NB}^B \stackrel{def}{=} [\omega_x \ \omega_y \ \omega_z]^T \tag{4}$$

In various implementations, the angular velocity of the body may be modeled as a stochastic process influenced by process noise w, according to Equation (5):

$$\frac{d\omega_{NB}^B}{dt} = w \tag{5}$$

The model of Equation (5) may correspond to a random walk model, a Wiener process model, or a Brownian motion model. In the absence of process noise, the model may assume constant angular velocity. The process noise w is assumed to have zero mean and covariance Q.

The orientation of the body may be represented using a quaternion $$q_B^N,$$

which defines the rotation of the body frame XYZ relative to the navigation frame ENU, according to Equation (6):

$$q_B^N \stackrel{def}{=} [q_w \ q_x \ q_y \ q_z]^T \tag{6}$$

A high-rate sensor, such as a gyroscope (e.g., sensor 108), may measure angular velocity according to Equation (7):

$$z(k+1) = \omega_{NB}^B(k+1) + n(k+1) \tag{7}$$

In Equation (7), where n(k+1) represents zero-mean measurement noise with covariance R. In various implementations, the sensor signal processing application 118 may estimate both the angular velocity and the quaternion state of the body to track orientation over time.

The quaternion and angular velocity together may define a state vector for orientation estimation. The orientation may evolve according to the quaternion kinematic equation, Equation (8):

$$\frac{dq_B^N}{dt} = \frac{1}{2} q_{\omega_{NB}^B} \odot q_B^N \tag{8}$$

In Equation (8), $$q_{\omega_{NB}^B}$$

represents the quaternion equivalent of the angular velocity $$q_{\omega_{NB}^B},$$

which may be defined according to Equation (9):

$$q_{\omega_{NB}^B} \stackrel{def}{=} \begin{bmatrix} 0 \\ \omega_{NB}^B \end{bmatrix} = [0 \ \omega_x \ \omega_y \ \omega_z]^T \tag{9}$$

Using the matrix representation of $$q_{\omega_{NB}^B},$$

the quaternion kinematic equation [Equation (8)] may be rewritten as Equation (10):

$$\frac{dq_B^N}{dt} = \frac{1}{2}\begin{bmatrix} 0 & -\omega_x & -\omega_y & -\omega_z \\ \omega_x & 0 & -\omega_z & \omega_y \\ \omega_y & \omega_z & 0 & -\omega_x \\ \omega_z & -\omega_y & \omega_x & 0 \end{bmatrix} q_B^N \tag{10}$$

By combining the angular velocity model [Equation (5)] with the quaternion kinematic equation [Equation (10)], the overall state model may be expressed as Equation (11):

$$\frac{d}{dt}\begin{bmatrix} q_w \\ q_x \\ q_y \\ q_z \\ \omega_x \\ \omega_y \\ \omega_z \end{bmatrix} = \begin{bmatrix} 0.5(-\omega_x q_x - \omega_y q_y - \omega_z q_z \\ 0.5(\omega_x q_w - \omega_z q_y + \omega_y q_z) \\ 0.5(\omega_y q_w + \omega_z q_x - \omega_x q_z) \\ 0.5(\omega_z q_w - \omega_y q_x + \omega_x q_y) \\ w_x \\ w_y \\ w_z \end{bmatrix} \tag{11}$$

Equation (11) may represent a state model that describes the system dynamics using a nonlinear equation with seven state variables. The state model defines the time evolution of the system's state vector, which consists of both the quaternion components $$q_B^N$$

representing the orientation of the body) and the angular velocity components $$\omega_{NB}^B$$

(representing the instantaneous rate of rotation). The first four equations in Equation (11) describe the evolution of the quaternion based on the current angular velocity, while the last three equations define how the angular velocity changes. In various implementations, the state model may include both linear and nonlinear components: the linear components represent the instantaneous rate of rotation of the body (e.g., angular velocity measurements from the sensor 108), and the quaternion components represent the current orientation of the body.

Figure 2:
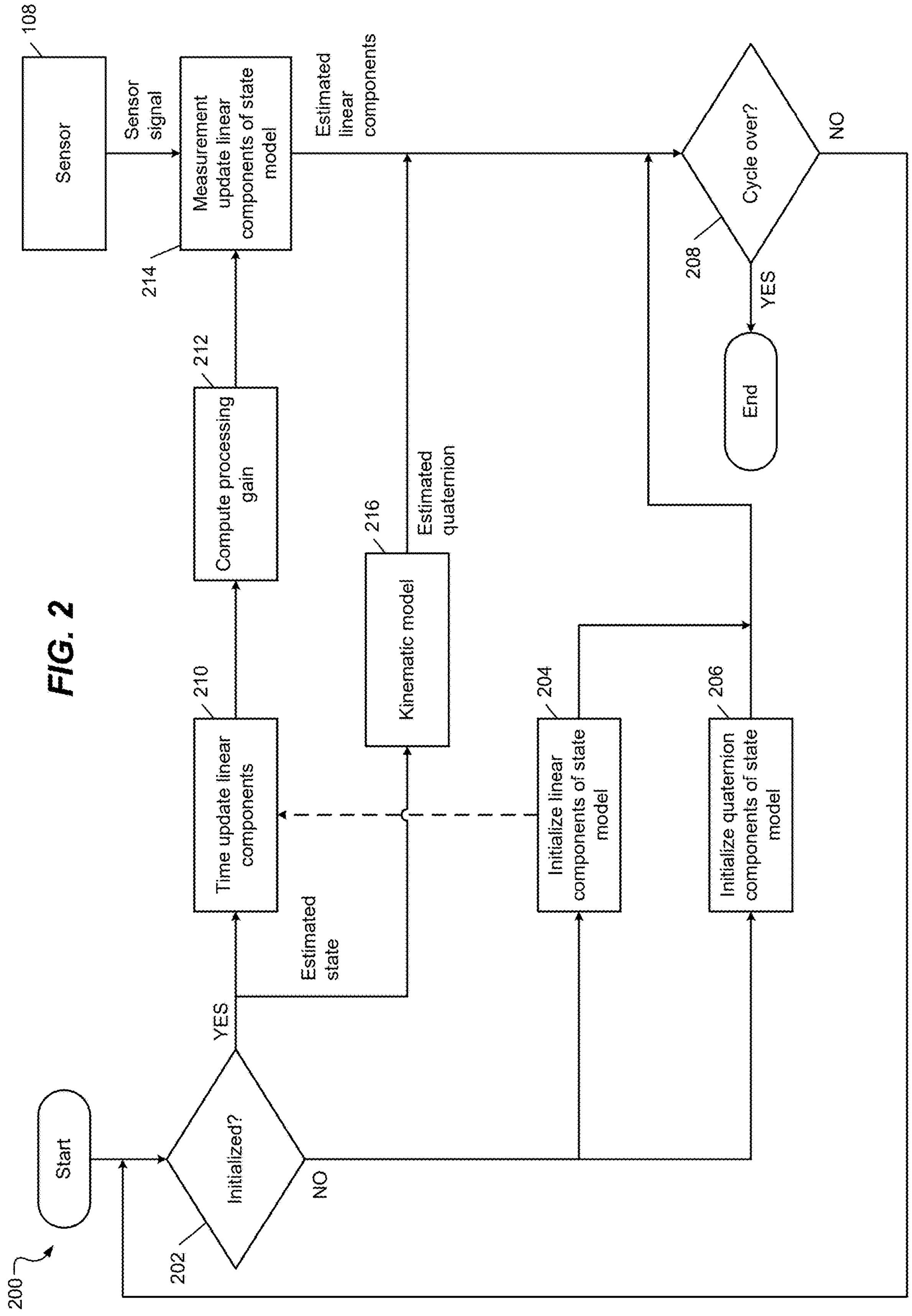
FIG. 2 is a block diagram illustrating one or more methods that may be implemented by a sensor signal processing application for updating a state model based on sensor signals, according to some examples.

FIG. 2 is a block diagram 200 illustrating one or more methods that may be implemented by the sensor signal processing application 118 for updating a state model based on sensor signals, according to some examples. As illustrated in the block diagram 200, the sensor signal processing application 118 may determine whether the state model is initialized (at block 202). In response to determining that the state model is not initialized ("NO" at block 202), the sensor signal processing application 118 may initialize the estimate and covariance of angular velocity as part of initializing the linear components of the state model (at block 204) and initialize the quaternion components of the state model (at block 206).

In various implementations, the state model may represent the dynamics of a rotating body by describing both its angular velocity and orientation over time. As an example, the state model may be expressed by Equation (11), which defines a nonlinear system of equations governing the evolution of the state vector. The state vector may include both the quaternion components $$q_B^N,$$

representing the body's orientation with respect to the navigation frame, and the angular velocity components $$\omega_{NB}^B,$$

representing the body's instantaneous rate of rotation. The first four equations in Equation (11) describe the time evolution of the quaternion based on the current angular velocity, while the last three equations define how the angular velocity changes over time.

To initialize the state model, the sensor signal processing application 118 may assign initial values to the angular velocity components $$\omega_{NB}^B$$

and the quaternion components $$q_B^N.$$

As part of block 204, the sensor signal processing application 118 may initialize an estimate of the angular velocity $$\omega_{NB}^B,$$

which may be derived from prior measurements of the sensor 108, which may be a gyroscope in some examples. Additionally, a covariance matrix Q, representing the uncertainty in the initial angular velocity estimate, may also be initialized at block 204. This covariance may reflect expected process noise, such as gyroscope bias instability or drift, as described in Equation (5). The initialized angular velocity estimate and covariance provide a starting point for the propagation of the angular velocity model, supporting accurate state estimation over time.

The initialization phase storage and subsequent utilization of the linear components of state (for example, as previously described) may be implemented in a variety of ways. The dashed line demonstrates an additional or alternative update methodology that may represent another implementation than that shown with the solid lines. In this additional or alternate implementation, the initialized linear components of the state model (at block 204) may be provided directly to the time update step (at block 210), facilitating early propagation of the angular velocity state prior to or in parallel with quaternion initialization (for example, at block 206).

At block 206, the quaternion $$q_B^N$$

may be initialized based on an initial orientation estimate, which may be derived from known conditions or from sensor observations. Once initialized, the quaternion may evolve according to the quaternion kinematic equation (Equation 8), ensuring that the estimated orientation remains consistent with the system's rotational motion.

By initializing both the linear and quaternion components of the state model, including the estimate and covariance of angular velocity, the sensor signal processing application 118 may establish a basis for subsequent updates using sensor measurements. As new sensor data becomes available, the state model may be refined to improve the accuracy of orientation estimation. The relationships described in Equation (11) may be used to propagate state estimates over time, allowing for real-time tracking of the body's orientation and angular velocity.

After initializing the linear components of the state model (at block 204) and the quaternion components of the state model (at block 206), the sensor signal processing application 118 may determine whether the cycle has ended (at decision block 208). In response to the sensor signal processing application 118 determining that the cycle has ended ("YES" at decision block 208), the process may terminate or reset as appropriate for the specific implementation. Otherwise, in response to the sensor signal processing application 118 determining that the cycle is not complete ("NO" at decision block 208), the sensor signal processing application 118 may proceed by again checking whether the state model is already initialized (at decision block 202).

In response to determining that the state model is initialized ("YES" at decision block 202), the sensor signal processing application 118 may time-update the linear components of the estimated state (at block 210). In various implementations, the time update step may involve propagating the angular velocity state using the dynamic model defined in Equation (5) and updating the state covariance matrix. The state covariance matrix, which represents uncertainty in the estimated angular velocity, may be updated based on the assumed process noise covariance Q, reflecting expected variations such as sensor drift and bias instability.

Following the time update of the linear components (at block 210), the sensor signal processing application 118 may compute the processing gain for the sensor 108 (at block 212). For example, the processing gain may be determined based on the statistical properties of the sensor measurements and the state covariance, influencing how new measurements are weighted when updating the state estimate.

Once the processing gain is computed, the sensor signal processing application 118 may perform a measurement update on the linear components of the state model (at block 214). This update may incorporate new sensor signals from the sensor 108 to refine the estimated angular velocity. In some examples, blocks 210-214 may collectively implement a linear state estimator, such as a Linear Kalman Filter, where the state (e.g., from a previous time increment) is first propagated forward in time at a time update step, and then refined using new measurements (e.g., from the current time increment) at a measurement update step to produce estimated linear components of the state model reflecting the instantaneous rate of rotation of the body at the current time increment (e.g., the output from block 214).

The sensor signal processing application 118 may also provide the state model, which includes the estimated angular velocity and quaternion, to a kinematic model (at block 216) to determine an updated quaternion representing the orientation of the body. In various implementations, the kinematic model may correspond to the quaternion kinematic equation, as described in Equation (8), which governs the time evolution of the quaternion based on angular velocity.

By applying the kinematic model, the sensor signal processing application 118 may propagate the quaternion state forward using angular velocity measurements from the sensor 108. The quaternion update may be performed numerically using integration methods such as first-order or second-order approximation techniques. In some implementations, the matrix representation of the kinematic model, as described in Equation (10), may be used to compute the updated quaternion.

The estimated quaternion output from block 216, together with the estimated linear components output from block 214, may collectively form the new state model representing the current time increment. The process then proceeds to decision block 208.

Errors in gyroscope measurements, as described in Equation (1), may introduce bias, noise, and scale factor inaccuracies, which can accumulate over time due to numerical integration when estimating orientation. Since the quaternion state is propagated using the estimated angular velocity through the quaternion kinematic equation [Equation (8)], any inaccuracies in angular velocity may be transferred into the quaternion estimate. Over successive time increments, these errors may accumulate, resulting in drift, where the estimated orientation gradually deviates from the true orientation of the body.

As illustrated in FIG. 2, the estimation process involves propagating angular velocity and updating the quaternion state. However, because each update step inherently relies on sensor data that may be affected by bias and noise, the errors introduced at each time increment may compound over time. The nonlinear nature of quaternion kinematics further influences how these errors evolve, potentially leading to significant deviations in estimated orientation. Left uncorrected, this drift may degrade the accuracy and reliability of the state model, particularly in long-duration operations or scenarios where precise orientation tracking is necessary.

To address these challenges, additional techniques may be implemented to mitigate drift and refine the quaternion estimate, improving long-term orientation accuracy. The following sections describe methods for correcting accumulated errors while maintaining computational efficiency.

Figure 3:
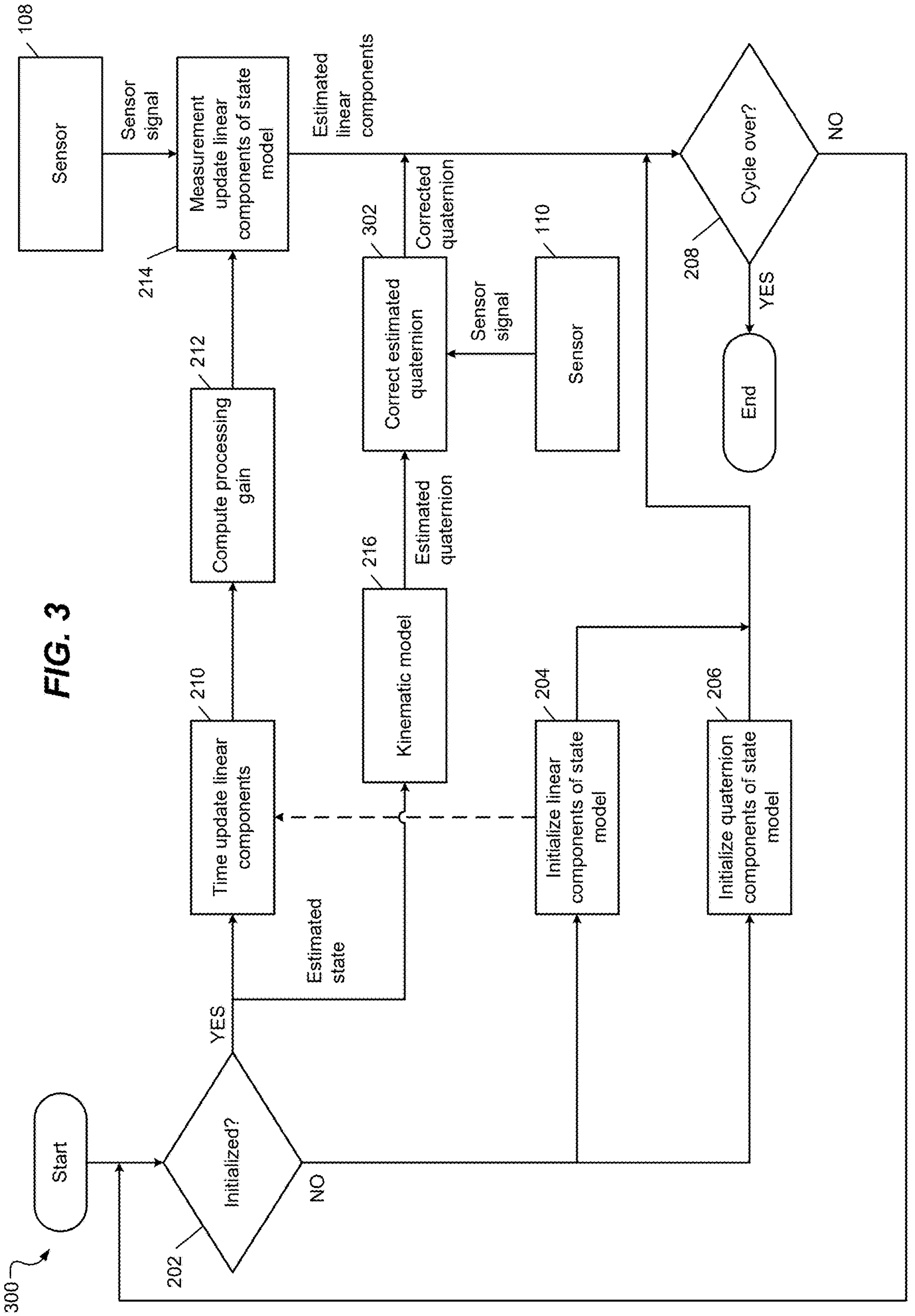
FIG. 3 is a block diagram illustrating one or more methods that may be implemented by a sensor signal processing application for updating and correcting a state model based on sensor signals, according to some examples.

FIG. 3 is a block diagram 300 illustrating one or more methods that may be implemented by the sensor signal processing application 118 for updating and correcting a state model based on sensor signals, according to some examples. The example of FIG. 3 is similar to the example of FIG. 2, except that the estimated quaternion output by the kinematic model (at block 216) may be refined using a correction process (at block 302) to generate a corrected quaternion. In various implementations, this correction may compensate for accumulated errors introduced by sensor noise, bias, or drift. Rather than propagating the estimated quaternion output from block 216 to the next time increment, the corrected quaternion output from block 302 may be used instead, along with the estimated linear components output from block 214, to form the state estimate for the next time increment.

In the example illustrated in FIG. 3, the sensor signal processing application 118 corrects the estimated quaternion (at block 302) based on sensor signals from the sensor 110. In various implementations, the sensor 110 is a magnetometer. For example, magnetometer measurements may be used to determine a magnetic field vector in the body frame.

Using a rotation matrix derived from the estimated quaternion, the measured magnetic field vector may be transformed into the navigation frame. Since the characteristics of the Earth's magnetic field are typically known for a given location, a reference magnetic field vector may be determined in the navigation frame. The transformed measured magnetic field vector may then be compared to the reference magnetic field vector. Any discrepancy between the transformed measurement and the reference value may be attributed to inaccuracies in the rotation matrix, which, in turn, may reflect errors in the estimated quaternion. To reduce this discrepancy, the quaternion may be iteratively adjusted, with the rotation matrix recalculated at each iteration. In various implementations, this iterative process continues until the error is minimized according to a predefined threshold or convergence criterion.

The sensor signal processing application 118 may implement the previously described error correction technique according to the following mathematical framework. The quaternion $$q_N^B$$

representing the rotation from the navigation frame ENU to the body frame XYZ may be defined according to Equation (12):

$$q_N^B \overset{def}{=} \left(q_B^N\right)^C = [q_w \ -q_x \ -q_y \ -q_z]^T \tag{12}$$

A vector in the navigation frame ENU, expressed as Equation (13):

$$v_{ENU} \overset{def}{=} [v_E \ v_N \ v_U]^T \tag{13}$$

Equation (13) may be transformed into the body frame XYZ according to Equation (14):

$$V_{XYZ} = \left(q_B^N\right)^C \odot v_{ENU} \odot q_B^N \overset{def}{=} [v_x \ v_y \ v_z]^T \tag{14}$$

The transformed components $v_x$, $v_y$, and $v_z$ of Equation (14) may computed according to Equations (15)-(17):

$$v_x = q_w(q_w v_E - q_Y v_U + q_z v_N) - q_y(q_w v_U - q_x v_N + q_y v_E) + q_x(q_x v_E + q_y v_N + q_z v_U) + q_Z(q_w v_N + q_x v_U - q_z v_E) \tag{15}$$

$$v_y = q_w(q_w v_N + q_x v_U - q_z v_E) + q_x(q_w v_U - q_x v_N + q_y v_E) + q_y(q_x v_E + q_y v_N + q_z v_U) - q_z(q_w v_E - q_y v_U + q_z v_N) \tag{16}$$

$$v_z = q_w(q_w v_U - q_x v_N + q_y v_E) - q_x(q_w v_N + q_x v_U - q_z v_E) + q_y(q_w v_E - q_y v_U + q_z v_N) + q_z(q_x v_E + q_y v_N + q_z v_U) \tag{17}$$

Equations (15)-(17) may be expressed in matrix form as Equation (18):

$$\begin{bmatrix} v_x \\ v_y \\ v_z \end{bmatrix} = R_N^B \begin{bmatrix} v_E \\ v_N \\ v_U \end{bmatrix} \tag{18}$$

The rotation matrix $$R_N^B$$

of Equation (18) may be defined according to Equation (19):

$$R_N^B = \begin{bmatrix} q_w^2 + q_x^2 - q_y^2 - q_z^2 & 2q_xq_y + 2q_wq_z & 2q_xq_z - 2q_wq_y \\ 2q_xq_y - 2q_wq_z & q_w^2 - q_x^2 + q_y^2 - q_z^2 & 2q_zq_y + 2q_wq_x \\ 2q_wq_y + 2q_xq_z & 2q_zq_y - 2q_wq_x & q_w^2 - q_x^2 - q_y^2 + q_z^2 \end{bmatrix} \tag{19}$$

Using this transformation, the measured magnetic field vector in the body frame can be transformed into the navigation frame. For example, the magnetometer may measure the unit vector $m_{ENU}$ along the magnetic field, defined in the navigation frame ENU as Equation (20):

$$m_{ENU} \overset{def}{=} [m_E \ m_N \ m_U]^T \tag{20}$$

Expressed in the body frame XYZ, the unit vector $m_{ENU}$ along the magnetic field is expressed as Equation (21):

$$m_{XYZ} = [m_x \ m_y \ m_z]^T \tag{21}$$

According to the previously defined transformation of Equation (18), equations relating $m_{ENU}$ and $m_{XYZ}$ can be expressed as Equation (22):

$$m_{XYZ} = R_N^B m_{ENU} \tag{22}$$

Let $$m_{XYZ}^M$$

represent the actual measurement of the magnetometer, including magnetometer noise. Using its components, this vector is defined by Equation (23):

$$m_{XYZ}^M \overset{def}{=} \left[m_x^M \ m_y^M \ m_z^M\right]^T \tag{23}$$

It is expected that $m_{XYZ}$ and $$m_{XYZ}^M$$

are reasonably close. Knowing the reference magnetic field vector $m_{ENU}$ in the ENU frame and the measured value $$m_{XYZ}^{M},$$

the sensor signal processing application 118 may adjust the quaternion defining $$R_{N}^{B}$$

to minimize the error $$\epsilon_{XYZ}^{M}$$

between $m_{XYZ}$ and the measured $$m_{XYZ}^{M},$$

which may be defined according to Equation (24):

$$\epsilon_{XYZ}^{M} \overset{def}{=} m_{XYZ} - m_{XYZ}^{M} = = R_{N}^{B} m_{ENU} - m_{XYZ}^{M} \tag{24}$$

This error minimization process may be performed iteratively, refining the quaternion estimate to improve orientation accuracy while maintaining computational efficiency. The full form of Equation (24) is available as Equations (54)-(56) in the Implementation Details section.

In various implementations, the sensor signal processing application 118 corrects the estimated quaternion (at block 302) based on sensor signals from the sensor 112 (not illustrated) instead of sensor signals from the sensor 110. In some examples, the sensor 112 is an accelerometer. Measurements from the accelerometer may be used to estimate the total acceleration in the body frame, which may include both gravitational acceleration and non-gravitational components such as centripetal and Coriolis accelerations. By isolating the gravitational component, a gravity vector in the body frame may be determined. This measured gravity vector may then be transformed into the navigation frame using a rotation matrix derived from the estimated quaternion. Since the characteristics of the gravity vector are typically known (e.g., about 1 g pointing downward in an Earth-fixed frame), a reference gravity vector may be established in the navigation frame. The difference between the transformed measured gravity vector and the reference gravity vector may be attributed to inaccuracies in the rotation matrix, which, in turn, may reflect errors in the quaternion. The sensor signal processing application 118 may iteratively refine the quaternion and recalculate the rotation matrix to reduce this difference.

The sensor signal processing application 118 may implement the previously described error correction technique according to the following mathematical framework. The accelerometer may measure the unit gravity vector $a_{ENU}$ in the navigation frame ENU, which may be expressed as Equation (25):

$$a_{ENU} \overset{def}{=} [\, a_E \quad a_N \quad a_U \,]^T \tag{25}$$

Expressed in the body frame XYZ, the gravity vector may be represented as $a_{XYZ}$, according to Equation (26):

$$a_{XYZ} = [\, a_x \quad a_y \quad a_z \,]^T \tag{26}$$

According to the previously defined transformation of Equation (18), the gravity vectors in the ENU and XYZ frames may be related according to Equation (27):

$$a_{XYZ} = R_{N}^{B} a_{ENU} \tag{27}$$

Let $$a_{XYZ}^{A}$$

represent the actual measurement of the accelerometer, which may include accelerometer noise and other dynamic effects. It is expected that $a_{XYZ}$ and $$a_{XYZ}^{A}$$

are reasonably close. Given the known reference gravity vector $a_{ENU}$ in the ENU frame and the measured value $$a_{XYZ}^{A},$$

the sensing signal processing application 118 may adjust the quaternion defining $$R_{N}^{B}$$

to minimize the error $$\epsilon_{XYZ}^{A},$$

which may be defined according to Equation (28):

$$\epsilon_{XYZ}^{A} \overset{def}{=} a_{XYZ} - a_{XYZ}^{A} = R_{N}^{B} a_{ENU} - a_{XYZ}^{A} \tag{28}$$

The measurement $$a_{XYZ}^{A}$$

is described next. The accelerometer may measure the total acceleration acting on the body, which may include contributions from multiple sources. These may include acceleration due to gravity, centripetal acceleration (acting toward the center of rotation), and Coriolis acceleration (if the body is moving within a rotating reference frame). The sensor signal processing application 118 may estimate these non-gravitational acceleration components based on the estimated angular velocity and subtract them from the total measured acceleration. The resulting estimate may isolate the gravitational acceleration component, which may then be used for orientation correction.

This error minimization process may be performed iteratively, refining the quaternion estimate to improve orientation accuracy while maintaining computational efficiency. The full form of Equation (28) is available as Equations (59)-(61) in the Implementation Details section.

Figure 4:
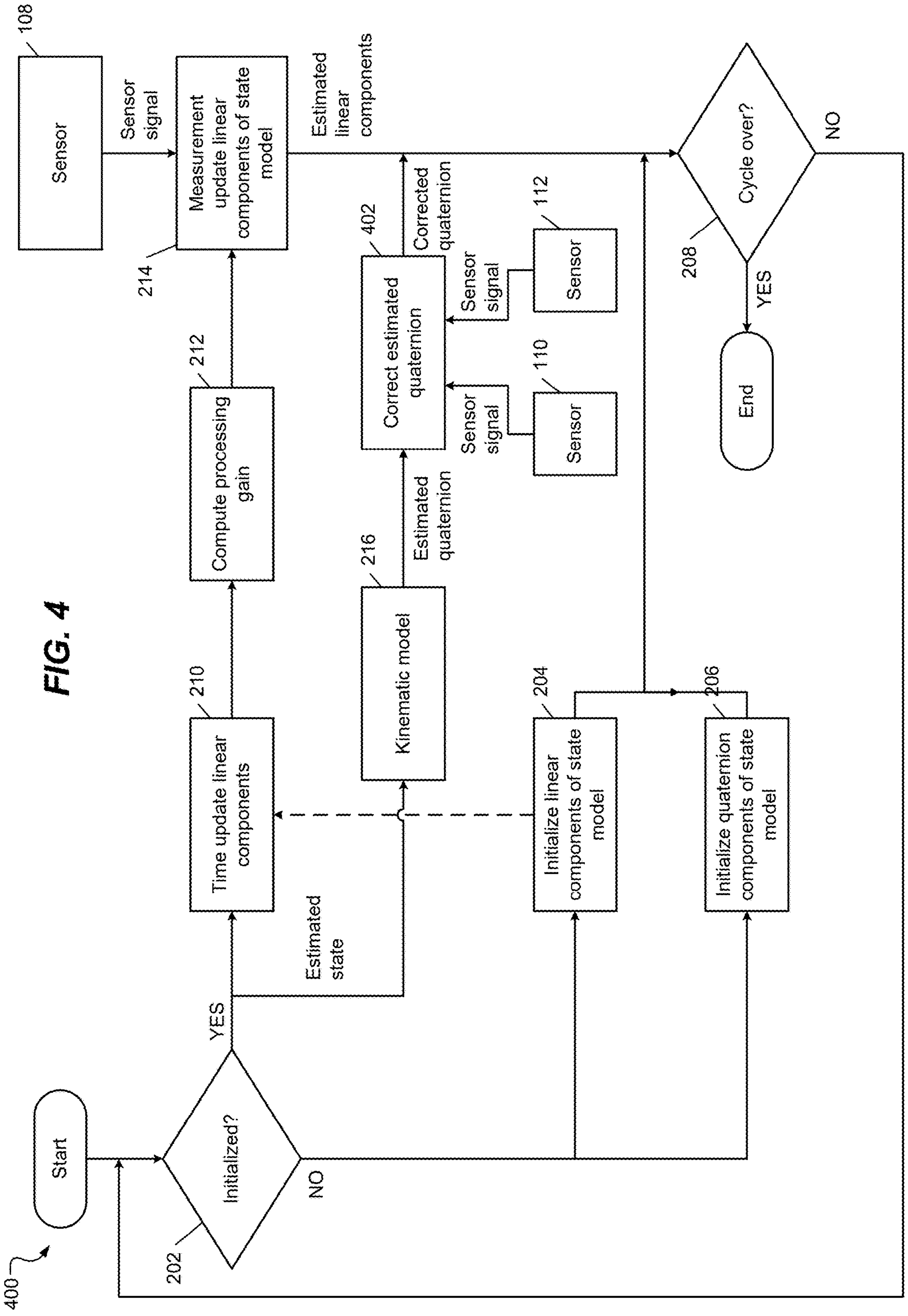
FIG. 4 is a block diagram illustrating one or more methods that may be implemented by a sensor signal processing application for updating and correcting a state model based on sensor signals, according to some examples.

FIG. 4 is a block diagram 400 illustrating one or more methods that may be implemented by the sensor signal processing application 118 for updating and correcting a state model based on sensor signals, according to some examples. The example of FIG. 4 is similar to the example of FIG. 3, except that the estimated quaternion output by the kinematic model (at block 216) may be refined using a correction process (at block 402) to generate a corrected quaternion. In the example of FIG. 4, the error correction process of block 402 is based on sensor signals from both the sensor 110 and the sensor 112.

In various implementations, measurements from both the sensor 110 (e.g., a magnetometer) and the sensor 112 (e.g., an accelerometer) may be combined to refine the quaternion estimate. The cross-product of the measured gravity vector from the accelerometer and the measured magnetic field vector from the magnetometer in the body frame may define a third orthogonal reference vector in the body frame. Using a rotation matrix derived from the estimated quaternion, this reference vector, along with the measured gravity and magnetic field vectors, may be transformed into the navigation frame. Since the reference gravity vector and the reference magnetic field vector in the navigation frame are typically known, the corresponding reference cross-product vector may also be determined. Any discrepancy between the transformed measured cross-product vector and the reference cross-product vector may be attributed to inaccuracies in the rotation matrix, which, in turn, may reflect errors in the estimated quaternion. The sensor signal processing application 118 may iteratively adjust the quaternion to minimize this discrepancy while recalculating the rotation matrix, thereby further refining the orientation estimate.

The sensor signal processing application 118 may implement the previously described quaternion refinement technique according to the following mathematical framework. The cross-product of the reference gravity vector $a_{ENU}$ and the reference magnetic field vector $m_{ENU}$ in the navigation frame ENU is expected to align in the negative East direction. Let this cross-product be denoted as $a_{ENU}$, where c represents the cross-product of a and m. Based on the transformation described in Equation (18), this vector may be expressed in the body frame XYZ as Equation (29):

$$c_{XYZ} = R_N^B c_{ENU} \tag{29}$$

In Equation (29), $$R_N^B$$

represents the rotation matrix derived from the estimated quaternion.

The measured accelerometer vector $$a_{XYZ}^A$$

and the measured magnetometer vector $$m_{XYZ}^M$$

in the body frame may be used to compute an experimentally determined cross-product vector, denoted as $$c_{XYZ}^{AM}.$$

Since both $c_{XYZ}$ and $$c_{XYZ}^{AM}$$

are expected to be reasonably close, the sensor signal processing application 118 may adjust the quaternion defining $$R_N^B$$

to minimize the difference between the $c_{XYZ}$ and $$c_{XYZ}^{AM}.$$

Thus, the error vector $$\epsilon_{XYZ}^{AM}$$

may be expressed according to Equation (30):

$$\epsilon_{XYZ}^{AM} \overset{def}{=} c_{XYZ} - c_{XYZ}^{AM} = R_N^B c_{ENU} - c_{XYZ}^{AM} \tag{30}$$

This error minimization process may be performed iteratively, refining the quaternion estimate while maintaining computational efficiency. By incorporating the cross-product vector into the correction framework, the system may enhance its ability to correct for orientation errors introduced by sensor drift or environmental disturbances. The full derivation of Equation (30) is available as Equations (64)-(66) in the Implementation Details section.

In various implementations, the sensor signal processing application 118 may refine the quaternion estimate by minimizing the cost function associated with Equations (24), (28), and/or (30) using a constrained optimization approach, for example, according to the following mathematical framework. The composite error vector, derived from these equations, may be expressed as Equation (31):

$$\epsilon_{XYZ} \stackrel{def}{=} \begin{bmatrix} \epsilon_{XYZ}^{M} \\ \epsilon_{XYZ}^{A} \\ \epsilon_{XYZ}^{AM} \end{bmatrix} = \begin{bmatrix} R_N^B m_{ENU} \\ R_N^B a_{ENU} \\ R_N^B c_{ENU} \end{bmatrix} - \begin{bmatrix} m_{XYZ}^{M} \\ a_{XYZ}^{A} \\ c_{XYZ}^{AM} \end{bmatrix} \tag{31}$$

In Equation (31), where $\epsilon_{XYZ}$ is a 9×1 error vector, and the unknown parameter is the four-component quaternion vector defining $$R_N^B.$$

Equation (31) may be reformulated in matrix form according to Equation (32):

$$\epsilon_{XYZ} = \begin{bmatrix} R_N^B & 0_{3\times3} & 0_{3\times3} \\ 0_{3\times3} & R_N^B & 0_{3\times3} \\ 0_{3\times3} & 0_{3\times3} & R_N^B \end{bmatrix} \begin{bmatrix} m_{ENU} \\ a_{ENU} \\ c_{ENU} \end{bmatrix} - \begin{bmatrix} m_{XYZ}^{M} \\ a_{XYZ}^{A} \\ c_{XYZ}^{AM} \end{bmatrix} \tag{32}$$

In Equation (31), the block diagonal structure of the transformation matrix accounts for the application of $$R_N^B$$

to each reference vector.

To formulate an optimization problem, individual cost functions for the magnetometer ($C_M$), accelerometer ($C_A$), and the cross-product constraint ($C_{AM}$) may be defined according to Equations (33)-(35):

$$C_M \stackrel{def}{=} (\epsilon_{XYZ}^{M})^T \epsilon_{XYZ}^{M} \tag{33}$$

$$C_A \stackrel{def}{=} (\epsilon_{XYZ}^{A})^T \epsilon_{XYZ}^{A} \tag{34}$$

$$C_{AM} \stackrel{def}{=} (\epsilon_{XYZ}^{AM})^T \epsilon_{XYZ}^{AM} \tag{35}$$

A cumulative cost function incorporating all three components may then be expressed according to Equation (36):

$$C \stackrel{def}{=} \epsilon_{XYZ}^T \epsilon_{XYZ} = C_M + C_A + C_{AM} \tag{36}$$

The optimization seeks to minimize C, Equation (36), subject to the unit quaternion constraint, Equation (37):

$$q_w^2 + q_x^2 + q_y^2 + q_z^2 = 1 \tag{37}$$

In matrix notation, Equation (37) is expressed according to Equation (38):

$$(q_B^N)^T q_B^N = [q_w \ q_x \ q_y \ q_z] \begin{bmatrix} q_w \\ q_x \\ q_y \\ q_z \end{bmatrix} = 1 \tag{38}$$

Because this may be a constrained minimization problem, it may be solved using the method of Lagrange multipliers. The Lagrangian function for this formulation may be written according to Equation (39):

$$L = C + \lambda[(q_B^N)^T q_B^N - 1] = (C_M + C_A + C_{AM}) + \lambda[(q_B^N)^T q_B^N - 1] \tag{39}$$

In Equation (39), the unknowns are the quaternion components defining $$q_B^N$$

and the Lagrange multiplier λ, forming a 5×1 vector of unknowns.

Minimization of Equation (39) may be expressed as Equations (40) and (41)

$$\frac{\partial L}{\partial q_B^N} = \frac{\partial (C_M + C_A + C_{AM})}{\partial q_B^N} + \lambda \frac{\partial [(q_B^N)^T q_B^N - 1]}{\partial q_B^N} = 0 \tag{40}$$

$$\frac{\partial L}{\partial \lambda} = (q_B^N)^C q_B^N - 1 = 0 \tag{41}$$

Simplifying Equations (40) and (41) yields Equations (42)-(46):

$$\frac{\partial L}{\partial q_w} = \frac{\partial (C_M + C_A + C_{AM})}{\partial q_w} + 2\lambda q_w = 0 \tag{42}$$

$$\frac{\partial L}{\partial q_x} = \frac{\partial (C_M + C_A + C_{AM})}{\partial q_x} + 2\lambda q_x = 0 \tag{43}$$

$$\frac{\partial L}{\partial q_y} = \frac{\partial (C_M + C_A + C_{AM})}{\partial q_y} + 2\lambda q_y = 0 \tag{44}$$

$$\frac{\partial L}{\partial q_z} = \frac{\partial (C_M + C_A + C_{AM})}{\partial q_z} + 2\lambda q_z = 0 \tag{45}$$

$$\frac{\partial L}{\partial \lambda} = q_w^2 + q_x^2 + q_y^2 + q_z^2 - 1 = 0 \tag{46}$$

Equations (42)-(46) define the gradient of the Lagrangian function in Equation (39) as Equation (47):

$$\nabla L \stackrel{def}{=} \left[\frac{\partial L}{\partial q_w} \ \frac{\partial L}{\partial q_x} \ \frac{\partial L}{\partial q_y} \ \frac{\partial L}{\partial q_z} \ \frac{\partial L}{\partial \lambda}\right]^T \tag{47}$$

Expressions for the components of Equation (47) may be available in the Implementation Details section. The solution to Equations (42)-(46) may be obtained using numerical optimization techniques. In various implementations, the sensor signal processing application 118 implements numerical optimization techniques according to the following mathematical framework.

For example, an augmented vector q may be defined according to Equation (48):

$$\tilde{q} \stackrel{def}{=} [q_w \ q_x \ q_y \ q_z \ \lambda]^T \tag{48}$$

In various implementations, the solution to Equations (42)-(46) may be determined numerically (see Implementation Details). This solution may be computed starting from an initial condition $\tilde{q}^0$ (k) and proceeding iteratively from i to i+1 at any time $t_k$ according to Equation (49):

$$\tilde{q}^{i+1}(t_k)=\tilde{q}^{i}(t_k)-H^{-1}(\nabla J) \tag{49}$$

The first four components of q~0(k)\tilde{q}^0(k)q~0(k) may be propagated in time according to Equation (50):

$$\frac{d}{dt}\begin{bmatrix} q_w \\ q_x \\ q_y \\ q_z \end{bmatrix}=\frac{1}{2}\begin{bmatrix} -\omega_x q_x-\omega_y q_y-\omega_z q_z \\ \omega_x q_w-\omega_z q_y+\omega_y q_z \\ \omega_y q_w+\omega_z q_x-\omega_x q_z \\ \omega_y q_w-\omega_y q_x+\omega_x q_y \end{bmatrix} \tag{50}$$

Equation (50) above may describe the quaternion kinematic propagation based on the estimated angular velocity components. This propagation may be initialized from the previous cycle's estimation of angular velocity and quaternion components, based on outputs from the upper four components of Equation (11). In various implementations, the initial condition of λ may be chosen as 1.

The gradient vector ∇J and Hessian matrix H in Equation (49) may be defined according to Equations (51) and (52):

$$\nabla J \overset{def}{=} \begin{bmatrix} \frac{\partial L}{\partial q_w} \\ \frac{\partial L}{\partial q_x} \\ \frac{\partial L}{\partial q_y} \\ \frac{\partial L}{\partial q_z} \\ \frac{\partial L}{\partial \lambda} \end{bmatrix} \tag{51}$$

$$H \overset{def}{=} \begin{bmatrix} \frac{\partial^2 L}{\partial q_w^2} & \frac{\partial^2 L}{\partial q_w \partial q_x} & \frac{\partial^2 L}{\partial q_w \partial q_y} & \frac{\partial^2 L}{\partial q_w \partial q_z} & \frac{\partial^2 L}{\partial q_w \partial \lambda} \\ \frac{\partial^2 L}{\partial q_x \partial q_w} & \frac{\partial^2 L}{\partial q_x^2} & \frac{\partial^2 L}{\partial q_x \partial q_y} & \frac{\partial^2 L}{\partial q_x \partial q_z} & \frac{\partial L}{\partial q_x \partial \lambda} \\ \frac{\partial^2 L}{\partial q_y \partial q_w} & \frac{\partial^2 L}{\partial q_y \partial q_x} & \frac{\partial^2 L}{\partial q_y^2} & \frac{\partial^2 L}{\partial q_y \partial q_w} & \frac{\partial L}{\partial q_y \partial \lambda} \\ \frac{\partial^2 L}{\partial q_z \partial q_w} & \frac{\partial^2 L}{\partial q_z \partial q_x} & \frac{\partial^2 L}{\partial q_z \partial q_y} & \frac{\partial^2 L}{\partial q_z^2} & \frac{\partial L}{\partial q_z \partial \lambda} \\ \frac{\partial^2 L}{\partial \lambda \partial q_w} & \frac{\partial^2 L}{\partial \lambda \partial q_x} & \frac{\partial^2 L}{\partial \lambda \partial q_y} & \frac{\partial^2 L}{\partial \lambda \partial q_z} & \frac{\partial^2 L}{\partial \lambda^2} \end{bmatrix} \tag{52}$$

Expressions for the components of Equations (51) and (52) are provided in the Implementation Details.

Figure 5:
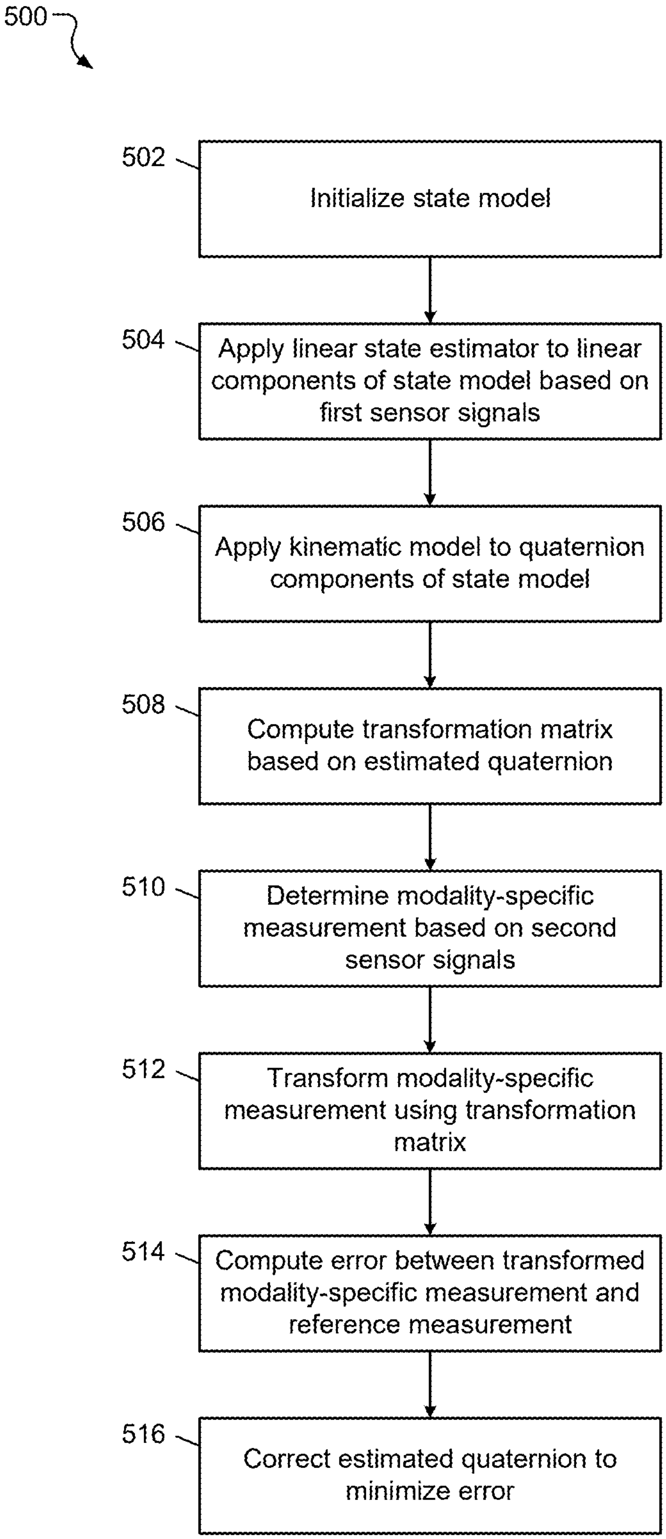
FIG. 5 is a flowchart illustrating a process for correcting an orientation of a sensor, according to some examples.

FIG. 5 is a flowchart illustrating a process 500 for correcting an orientation of a sensor 106, according to some examples. Although the operations of the process 500 are illustrated with reference to particular examples disclosed herein, the process 500 may be used in any suitable setting to perform any suitable support operations. Operations are illustrated once each and in a particular order in FIG. 5, but the operations may be reordered and/or repeated as desired and appropriate (e.g., different operations performed may be performed in parallel, as suitable).

In the example process 500, the sensor signal processing application 118 may initialize a state model (at block 502). The sensor signal processing application 118 may initialize the state model according to any of the previously described techniques. As previously described, the state model may include linear components representing an instantaneous rate of rotation of a body and quaternion components representing the current orientation of the body. In various implementations, the initialization of the state model may involve setting initial values for angular velocity estimates and quaternion components based on prior sensor observations, known initial conditions, or other initialization strategies, such as those described with reference to Equations (5)-(11). In some examples, an initial state covariance matrix may be assigned to represent the uncertainty associated with these estimates, as discussed with reference to block 204 of FIG. 2.

In the example process 500, the sensor signal processing application 118 applies a linear state estimator to the linear components of the state model based on first sensor signals (at block 504), for example, according to any of the previously described techniques. In various implementations, the sensor signal processing application 118 estimates the angular velocity of the body using a linear state estimator, such as a Linear Kalman Filter, which models angular velocity as a dynamic process influenced by process noise. The linear state estimator may apply a time update step (for example, block 210 of FIGS. 2-4), where the angular velocity state is propagated based on prior estimates, and a measurement update step (for example, block 214 of FIGS. 2-4), where new sensor signals (e.g., from sensor 108) may be used to refine the angular velocity estimate. In some examples, the estimation process incorporates a state covariance matrix that accounts for expected variations due to sensor noise and drift, for example, as described with reference to block 210 of FIGS. 2-4.

By applying the linear state estimator, the sensor signal processing application 118 may provide a computationally efficient method for estimating the instantaneous angular velocity of the body while managing measurement uncertainty. The estimated angular velocity may then be used to update the state model for orientation tracking, as described in previous examples.

In the example process 500, the sensor signal processing application 118 applies a kinematic model to the quaternion components of the state model (at block 506). The sensor signal processing application 118 may apply the kinematic model according to any of the previously described techniques. For example, as described with reference to Equations (8)-(11), the quaternion state may evolve over time according to the quaternion kinematic equation, which defines the relationship between angular velocity and orientation in three-dimensional space. In various implementations, the kinematic model may propagate the quaternion forward using numerical integration methods, such as a first-order or second-order approximation, or by leveraging the matrix representation of the quaternion kinematic equation, as discussed with reference to Equation (10).

In some examples, the sensor signal processing application 118 uses angular velocity estimates, previously computed using a linear state estimator (e.g., a Linear Kalman Filter, as described with reference to blocks 210-214 of FIGS. 2-4), to update the quaternion state. The estimated angular velocity may be used to compute the quaternion derivative, which may then be integrated over the current time increment to obtain an updated quaternion estimate. The propagation step may maintain computational efficiency by avoiding nonlinear transformations.

By applying the kinematic model, the sensor signal processing application 118 may update the quaternion components of the state model in a manner consistent with the estimated angular velocity while maintaining a fully linear processing framework. The updated quaternion may then serve as the basis for subsequent refinement steps, such as the correction techniques described with reference to blocks 302 and 402 of FIGS. 3-4, where additional sensor measurements (e.g., from magnetometers or accelerometers) may be used to refine the estimated orientation.

For example, in the example process 500, the sensor signal processing application 118 may compute a transformation matrix based on the estimated quaternion (at block 508), according to any of the previously described techniques. In various implementations, the transformation matrix represents the orientation of the body frame relative to a navigation frame, allowing measurements expressed in the body frame to be transformed into the navigation frame. For example, as described with reference to Equations (19), the transformation matrix may be derived from the estimated quaternion, facilitating the conversion of sensor measurements from different modalities into a unified reference frame. The computed transformation matrix may be used in subsequent processing steps to refine orientation estimation, including error correction based on reference measurements.

In the example process 500, the sensor signal processing application 118 may determine modality-specific measurements based on sensor signals from the sensor 110 or the sensor 112 (at block 510), according to any of the previously described techniques. The modality of the sensors 110 and 112 may be different from the modality of the sensor 108, allowing for complementary measurement characteristics. For example, as described with reference to Equations (3) and (21), the sensor 110 may provide magnetic field vector measurements, while as described with reference to Equations (2) and (26), the sensor 112 may provide acceleration measurements that can be used to estimate gravitational acceleration.

In the example process 500, the sensor signal processing application 118 may transform the modality-specific measurement based on the sensor signals from the sensor 110 or the sensor 112 (at block 512), according to any of the previously described techniques. In various implementations, the transformation includes applying the computed transformation matrix to express the measured values in the navigation frame. For example, as described with reference to Equations (18) and (22), a magnetic field measurement from the sensor 110 may be transformed from the body frame to the navigation frame to compare against a known reference magnetic field. Similarly, as described with reference to Equations (27) and (28), an acceleration measurement from the sensor 112 may be transformed to estimate the gravity vector in the navigation frame. These transformations may facilitate direct comparison between measured and reference values, supporting orientation error correction.

In the example process 500, the sensor signal processing application 118 may compute the error between the transformed modality-specific measurement and the reference measurement (at block 514), according to any of the previously described techniques. For example, as described with reference to Equations (24) and (28), the sensor signal processing application 118 may compute an error metric by comparing the transformed measurement with an expected reference value in the navigation frame. In various implementations, this error may represent discrepancies due to sensor drift, noise, or integration inaccuracies, which may accumulate over time. The computed error may serve as an input to an iterative correction process, refining the estimated orientation.

In the example process 500, the sensor signal processing application 118 may correct the estimated quaternion to minimize the error between the transformed modality-specific measurement and the reference measurement (at block 516), according to any of the previously described techniques. In various implementations, this correction is performed iteratively using optimization techniques, such as those described with reference to Equations (36)-(39). The correction process may involve adjusting the quaternion defining the transformation matrix to minimize discrepancies between transformed sensor measurements and known reference values, as described with reference to Equations (30) and (31). By refining the quaternion estimate, the sensor signal processing application 118 may mitigate accumulated orientation errors, reducing drift while maintaining computational efficiency.

Figure 6:
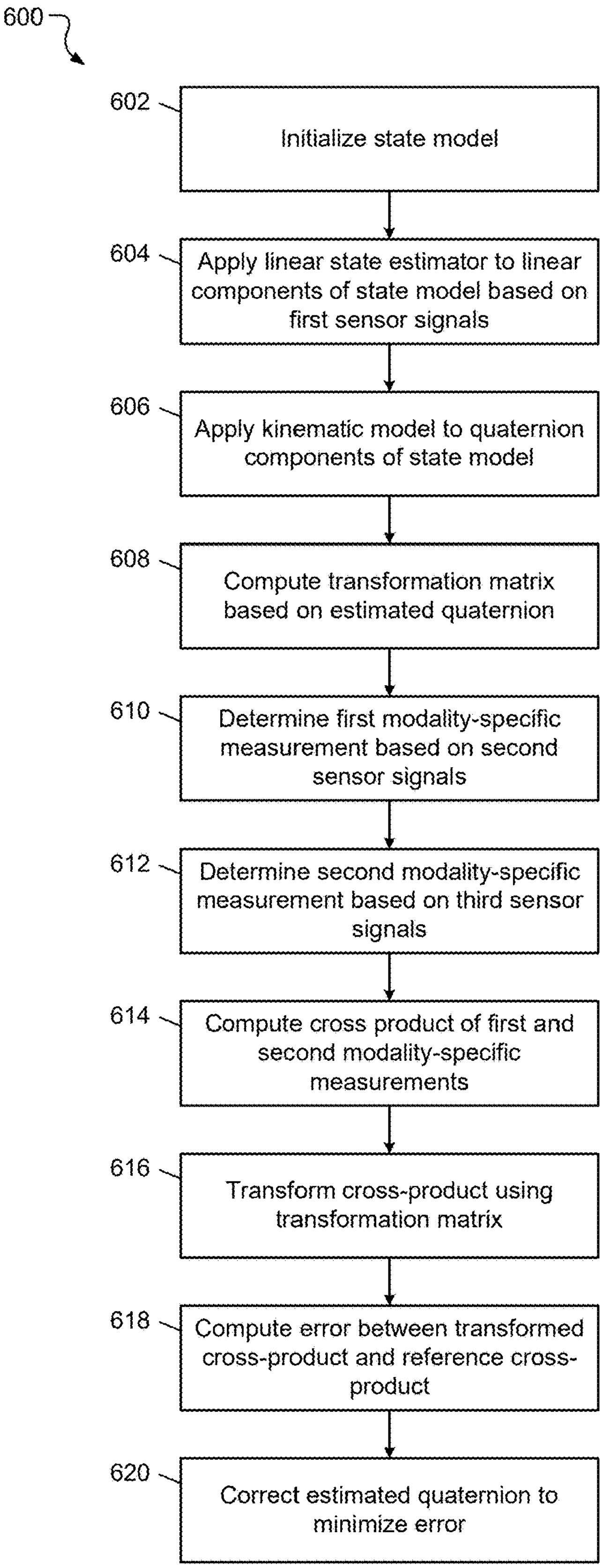
FIG. 6 is a flowchart illustrating a process for correcting an orientation of a sensor, according to some examples.

FIG. 6 is a flowchart illustrating a process 600 for correcting an orientation of a sensor 106, according to some examples. Although the operations of the process 600 are illustrated with reference to particular examples disclosed herein, the process 600 may be used in any suitable setting to perform any suitable support operations. Operations are illustrated once each and in a particular order in FIG. 6, but the operations may be reordered and/or repeated as desired and appropriate (e.g., different operations performed may be performed in parallel, as suitable).

In process 600, the operations performed at blocks 602-608 may be substantially similar to the operations performed at blocks 502-508 of process 500. In process 600, the sensor signal processing application 118 may determine first modality-specific measurements based on sensor signals from sensor 110 (at block 610), according to any of the previously described techniques. The modality of sensor 110 may be different from the modality of sensor 108. For example, as described with reference to Equations (3) and (21), sensor 110 may provide magnetic field vector measurements.

In process 600, the sensor signal processing application 118 may determine second modality-specific measurements based on sensor signals from sensor 112 (at block 612), according to any of the previously described techniques. The modality of sensor 112 may be different from the modality of sensor 108 and sensor 110. For example, as described with reference to Equations (2) and (26), sensor 112 may provide acceleration measurements that can be used to estimate gravitational acceleration.

In process 600, the sensor signal processing application 118 may compute a cross-product of the first and second modality-specific measurements (at block 614), for example, according to any of the previously described techniques. In some examples, this cross-product may represent an additional reference vector that is perpendicular to both the measured gravity vector and the measured magnetic field vector in the body frame.

In process 600, the sensor signal processing application 118 may transform the cross-product using a transformation matrix (at block 616), for example, according to any of the previously described techniques. The transformation matrix may be derived from the estimated quaternion and may facilitate expressing the cross-product in a navigation frame. As described with reference to Equations (18) and (22), this transformation allows for direct comparison with a known reference cross-product vector in the navigation frame.

In process 600, the sensor signal processing application 118 may compute the error between the transformed cross-product and the reference cross-product (at block 618), for example, according to any of the previously described techniques. This error may quantify discrepancies due to sensor noise, drift, or inaccuracies in the estimated quaternion. In some examples, the computed error may be used as part of an iterative correction process to refine the estimated orientation of the sensor platform 102.

In process 600, the sensor signal processing application 118 may correct the estimated quaternion to minimize the error (at block 620), for example, according to any of the previously described techniques. In some implementations, this correction may be performed using an optimization approach, such as the minimization techniques described with reference to Equations (36)-(39). The refined quaternion estimate may then be used to update the transformation matrix, improving orientation accuracy while maintaining computational efficiency.

Implementation Details

This section presents the full-form expressions of the errors previously formulated for individual sensor measurements, including those from the magnetometer, the accelerometer, and the cross-product of the accelerometer and magnetometer. In the following equations, the unit vector constraint on the quaternion [Equation (46)], as well as on the magnetometer, accelerometer, and their cross-product in the East-North-Up (ENU) frame, may be applied.

The error contributions from the magnetometer, denoted as $$\epsilon_{XYZ}^{M},$$

may be expressed as shown in Equation (53):

$$\epsilon_{XYZ}^{M} \stackrel{def}{=} \begin{bmatrix} \epsilon_X^M \\ \epsilon_Y^M \\ \epsilon_Z^M \end{bmatrix} \tag{53}$$

where:

$$\epsilon_X^M = \left(q_w^2 + q_x^2 - q_y^2 - q_z^2\right)m_E + (2q_xq_y + 2q_wq_z)m_N + (2q_xq_z - 2q_wq_y)m_U - m_X^M = m_E - m_X^M - 2m_Eq_y^2 - 2m_Eq_z^2 + (2q_xq_y + 2q_wq_z)m_N + (2q_xq_z - 2q_wq_y)m_U \tag{54}$$

$$\epsilon_Y^M = (2q_xq_y - 2q_wq_z)m_E + \left(q_w^2 - q_x^2 + q_y^2 - q_z^2\right)m_N + (2q_zq_y - 2q_wq_x)m_U - m_Y^M = m_N - m_Y^M - 2m_Nq_x^2 - 2m_Nq_z^2 + (2q_xq_y + 2q_wq_z)m_E + (2q_zq_y - 2q_wq_x)m_U \tag{55}$$

$$\epsilon_Z^M = (2q_wq_y + 2q_xq_z)m_E + (2q_zq_y + 2q_wq_x)m_N + \left(q_w^2 - q_x^2 - q_y^2 + q_z^2\right)m_U - m_Z^M = m_U - m_Z^M - 2q_x^2m_U - 2q_y^2m_U + (2q_wq_y + 2q_xq_z)m_E + (2q_zq_y - 2q_wq_x)m_N \tag{56}$$

The magnetometer's contribution [from Equations (33) and (54)-(56)] to the cumulative cost function [Equation (36)], denoted as $C_M$, may be formulated as shown in Equation (57):

$$C_m \stackrel{def}{=} \left(\epsilon_{XYZ}^M\right)^T \epsilon_{XYZ}^M = \begin{bmatrix} \epsilon_X^M & \epsilon_Y^M & \epsilon_Z^M \end{bmatrix} \begin{bmatrix} \epsilon_X^M \\ \epsilon_Y^M \\ \epsilon_Z^M \end{bmatrix} = \left(\epsilon_X^M\right)^2 + \left(\epsilon_Y^M\right) + \left(\epsilon_Z^M\right)^2 = \left[\left(1 - 2q_y^2 - 2q_z^2\right)m_E + (2q_xq_y + 2q_wq_z)m_N + (2q_xq_z - 2_wq_y)m_U - m_X^M\right]^2 + \left[(2q_xq_y + 2q_wq_z)m_E + \left(1 - 2q_x^2 - 2q_z^2\right)m_N + (2q_zq_y + 2q_wq_x)m_U - m_Y^M\right]^2 + \left[(2q_wq_y + 2q_xq_z)m_E + [(2q_zq_y + 2q_wq_x)m_N + \left(1 - 2q_x^2 - 2_y^2\right)m_U - m_Z^M\right]^2 = 4m_Em_X^M\left(q_y^2 + q_z^2\right) - 2m_Nm_Y^M - 2m_Um_Z^M - 2m_Em_X^M + 4m_Nm_Y^M\left(q_x^2 + q_z^2\right) + 4m_Um_Z^M\left(q_x^2 + q_y^2\right) + 4m_Em_Y^M(q_wq_z - q_xq_y) - 4m_Em_Z^M(q_wq_y + q_xq_z) - 4m_Nm_X^M(q_wq_z + q_xq_y) + 4m_Nm_Z^M(q_wq_x - q_yq_z) + 4m_Um_X^M(q_wq_y + q_xq_z) - 4m_Um_Y^M(q_wq_x - q_yq_z) + 2 \tag{57}$$

The error contributions from the accelerometer, denoted as $$\epsilon_{XYZ}^{A},$$

may be defined as shown in Equation (58):

$$\epsilon_{XYZ}^{A} \stackrel{def}{=} \begin{bmatrix} \epsilon_X^A \\ \epsilon_Y^A \\ \epsilon_Z^A \end{bmatrix} \tag{58}$$

where:

$$\epsilon_X^A = \left(q_w^2 + q_x^2 - q_y^2 - q_z^2\right)a_E + (2q_xq_y + 2q_wq_z)a_N + (2q_xq_z - 2q_wq_y)a_U - a_X^A = a_E - a_X^A - 2a_Eq_y^2 - 2a_Eq_z^2 + (2q_xq_y + 2q_wq_z)a_N + (2q_xq_z - 2q_wq_y)a_U \tag{59}$$

$$\epsilon_Y^A = (2q_xq_y - 2q_wq_z)a_E + \left(q_w^2 - q_x^2 + q_y^2 - q_z^2\right)a_N + (2q_zq_y - 2q_wq_x)a_U - a_Y^A = a_N - a_Y^A - 2a_Nq_x^2 - 2a_Nq_z^2 + (2q_xq_y + 2q_wq_z)a_E + (2q_zq_y - 2q_wq_x)a_U \tag{60}$$

$$\epsilon_Z^A = (2q_wq_y + 2q_xq_z)a_E + (2q_zq_y + 2q_wq_x)a_N + \left(q_w^2 - q_x^2 - q_y^2 + q_z^2\right)a_U - a_Z^A = a_U - a_Z^A - 2q_x^2a_U - 2q_y^2a_U + (2q_wq_y + 2q_xq_z)a_E + (2q_zq_y - 2q_wq_x)a_N \tag{61}$$

The contribution from the accelerometer [from Equations (34) and (59)-(61)] to the cumulative cost function [Equation (36)] is:

$$C_A \overset{def}{=} \left(\epsilon_{XYZ}^{A}\right)^T \epsilon_{XYZ}^{A} = \begin{bmatrix} \epsilon_X^A & \epsilon_Y^A & \epsilon_Z^A \end{bmatrix} \begin{bmatrix} \epsilon_X^A \\ \epsilon_Y^A \\ \epsilon_Z^A \end{bmatrix} = \left(\epsilon_X^A\right)^2 + \left(\epsilon_Y^A\right)^2 + \left(\epsilon_Z^A\right)^2 = \tag{62}$$

$$\begin{aligned} &\left[\left(1-2q_y^2-2q_z^2\right)a_E + (2q_xq_y+2q_wq_z)a_N + (2q_xq_z-2q_wq_y)a_U - a_X^A\right]^2 + \left[(2q_xq_y-2q_wq_z)a_E + \left(1-2q_x^2-2q_z^2\right)a_N + (2q_zq_y+2q_wq_x)a_U - a_Y^A\right]^2 + \\ &\left[(2q_wq_y+2q_xq_z)a_E + (2q_zq_y-2q_wq_x)a_N + \left(1-2q_x^2-2q_y^2\right)a_U - a_Z^A\right]^2 = 4a_Ea_X^A\left(q_y^2+q_z^2\right) - \\ &2a_Na_Y^A - 2a_Ua_Z^A - 2a_Ea_X^A + 4a_Na_Y^A\left(q_x^2+q_z^2\right) + 4a_Ua_Z^M\left(q_x^2+q_y^2\right) + 4a_Ea_Y^A(q_wq_z-q_xq_y) - \\ &4a_Ea_Z^A(q_wq_y+q_xq_z) - 4a_Na_X^A(q_wq_z+q_xq_y) + 4a_Na_Z^A(q_wq_x-q_yq_z) + 4a_Ua_X^A(q_wq_y-q_xq_z) - 4a_Ua_Y^A(q_wq_x+q_yq_z) + 2 \end{aligned}$$

For determining the error in the cross-product of the accelerometer and the magnetometer, the error contributions $$\epsilon_{XYZ}^{M}$$

from the magnetometer may be defined according to:

$$\epsilon_{XYZ}^{AM} \overset{def}{=} \begin{bmatrix} \epsilon_X^{AM} \\ \epsilon_Y^{AM} \\ \epsilon_Z^{AM} \end{bmatrix} \tag{63}$$

where:

$$\begin{aligned} \epsilon_X^{AM} &= \left(q_w^2+q_x^2-q_y^2-q_z^2\right)c_E + (2q_xq_y+2q_wq_z)c_N + (2q_xq_z-2q_wq_y)c_U - c_X^{AM} = \\ &c_E - c_X^{AM} - 2c_Eq_y^2 - 2c_Eq_z^2 + (2q_xq_y+2q_wq_z)c_N + (2q_xq_z-2q_wq_y)c_U \end{aligned} \tag{64}$$

$$\begin{aligned} \epsilon_Y^{AM} &= (2q_xq_y-2q_wq_z)c_E + \left(q_w^2-q_x^2+q_y^2-q_z^2\right)c_N + (2q_zq_y+2q_wq_x)c_U - c_Y^{AM} = \\ &c_N - c_Y^{AM} - 2c_Nq_x^2 - 2c_Nq_z^2 + (2q_xq_y-2q_wq_z)c_E + (2q_zq_y+2q_wq_x)c_U \end{aligned} \tag{65}$$

$$\begin{aligned} \epsilon_Z^{AM} &= (2q_wq_y+2q_xq_z)c_E + (2q_zq_y-2q_wq_x)c_N + \left(q_w^2-q_x^2-q_y^2+q_z^2\right)c_U - c_Z^{AM} = \\ &c_U - c_Z^{AM} - 2q_x^2a_U - 2q_y^2a_U + (2q_wq_y+2q_xq_z)c_E + (2q_zq_y-2q_wq_x)c_N \end{aligned} \tag{66}$$

The contribution from the cross-product of the accelerometer and the magnetometer [from Equations (35) and (64)-(66)] to the cumulative cost function [Equation (36)] may be:

$$C_{AM} \overset{def}{=} \left(\epsilon_{XYZ}^{AM}\right)^T \epsilon_{XYZ}^{AM} = \begin{bmatrix} \epsilon_X^{AM} & \epsilon_Y^{AM} & \epsilon_Z^{AM} \end{bmatrix} \begin{bmatrix} \epsilon_X^{AM} \\ \epsilon_Y^{AM} \\ \epsilon_Z^{AM} \end{bmatrix} = \left(\epsilon_X^A\right)^2 + \left(\epsilon_Y^A\right)^2 + \left(\epsilon_Z^A\right)^2 = \tag{67}$$

$$\begin{aligned} &\left[\left(1-2q_y^2-2q_z^2\right)c_E + (2q_xq_y+2q_wq_z)c_N + (2q_xq_z-2q_wq_y)c_U - c_X^{AM}\right]^2 + \left[(2q_xq_y-2q_wq_z)c_E + \left(1-2q_x^2-2q_z^2\right)c_N + (2q_zq_y+2q_wq_x)c_U - c_Y^{AM}\right]^2 + \\ &\left[(2q_wq_y+2q_xq_z)c_E + (2q_zq_y-2q_wq_x)c_N + \left(1-2q_x^2-2q_y^2\right)c_U - c_Z^{AM}\right]^2 = 4c_Ec_X^{AM}\left(q_y^2+q_z^2\right) - \\ &2c_Nc_Y^{AM} - 2c_Uc_Z^{AM} - 2c_Ec_X^{AM} + 4c_Nc_Y^{AM}\left(q_x^2+q_z^2\right) + 4c_Uc_Z^{AM}\left(q_x^2+q_y^2\right) + 4c_Ec_Y^{AM}(q_wq_z-q_xq_y) - \\ &4c_Ec_Z^{AM}(q_wq_y+q_xq_z) - 4c_Nc_X^{AM}(q_wq_z+q_xq_y) + 4c_Nc_Z^{AM}(q_wq_x-q_yq_z) + 4c_Uc_X^{AM}(q_wq_y-q_xq_z) - 4c_Uc_Y^{AM}(q_wq_x+q_yq_z) + 2 \end{aligned}$$

This section provides implementation details for computing partial derivatives, according to some examples. While the cost function in Equation (36) and its components in Equations (57), (62), and (67) may initially seem complex, there is an underlying simplicity, as explained below. The algorithm may involve the elements of the matrix introduced in Equation (19), their derivatives with respect to the quaternion components, the elements of the known vector in the ENU frame (i.e., $m_{ENU}$, $a_{ENU}$, $c_{ENU}$), and the noisy measured values (i.e., $$m_{XYZ}^{M}, a_{XYZ}^{A}, c_{XYZ}^{AM}).$$

Recognizing this simplicity amidst the mathematical intensity may be beneficial for effective implementation. The following sections address the computation of partial derivatives for the magnetometer, accelerometer, and the cross-product of the accelerometer and magnetometer. After the formulas for the magnetometer are understood, they can serve as a prototype and be applied similarly to the accelerometer and the cross-product terms.

For the magnetometer:

$$\frac{\partial C_M}{\partial q_w} = 4m_Em_Y^Mq_z - 4m_Em_Z^Mq_y - 4m_Nm_X^Mq_z + 4m_Nm_Z^Mq_x + 4m_Um_X^Mq_y - 4m_Um_Y^Mq_x \tag{68}$$

$$\frac{\partial C_M}{\partial q_x} = 8m_Nm_Y^Mq_x + 8m_Um_Z^Mq_x - 4m_Em_Y^Mq_y - 4m_Em_Z^Mq_z - 4m_Nm_X^Mq_y + 4m_Nm_Z^Mq_w - 4m_Um_X^Mq_z - 4m_Um_Y^Mq_w \tag{69}$$

$$\frac{\partial C_M}{\partial q_y} = 8m_Em_X^Mq_y + 8m_Um_Z^Mq_y - 4m_Em_Y^Mq_x - 4m_Em_Z^Mq_w - 4m_Nm_X^Mq_x - 4m_Nm_Z^Mq_z + 4m_Um_X^Mq_w - 4m_Um_Y^Mq_z \tag{70}$$

$$\frac{\partial C_M}{\partial q_z} = 8m_Em_X^Mq_z + 8m_Nm_Y^Mq_z + 4m_Em_Y^Mq_w - 4m_Em_Z^Mq_x - 4m_Nm_X^Mq_w - 4m_Nm_Z^Mq_y - 4m_Um_X^Mq_x - 4m_Um_Y^Mq_y \tag{71}$$

For the accelerometer:

$$\frac{\partial C_A}{\partial q_w} = \tag{72}$$

-continued $$4a_E a_Y^A q_z - 4a_E a_Z^A q_y - 4a_N a_X^A q_z + 4a_N a_Z^A q_x + 4a_U a_X^A q_y - 4a_U a_Y^A q_x$$

$$\frac{\partial C_A}{\partial q_x} = 8a_N a_Y^A q_x + 8a_U a_Z^A q_x - 4a_E a_Y^A q_y - 4a_E a_Z^A q_z - 4a_N a_X^A q_y + 4a_N a_Z^A q_w - 4a_U a_X^A q_z - 4a_U a_Y^A q_w \tag{73}$$

$$\frac{\partial C_A}{\partial q_y} = 8a_E a_X^A q_y + 8a_U a_Z^A q_y - 4a_E a_Y^A q_x - 4a_E a_Z^A q_w - 4a_N a_X^A q_x - 4a_N a_Z^A q_z + 4a_U a_X^A q_w - 4a_U a_Y^A q_z \tag{74}$$

$$\frac{\partial C_A}{\partial q_Z} = 8a_E a_X^A q_z + 8a_N a_Y^A q_z + 4a_E a_Y^A q_w - 4a_E a_Z^A q_x - 4a_N a_X^A q_w - 4a_N a_Z^A q_y - 4a_U a_X^A q_x - 4a_U a_Y^A q_y \tag{75}$$

For the cross-product of the accelerometer and magnetometer:

$$\frac{\partial C_{AM}}{\partial q_w} = 4c_E c_Y^{AM} q_z - 4c_E c_Z^{AM} q_y - 4c_N c_X^{AM} q_z + 4c_N c_Z^{AM} q_x + 4c_U c_X^{AM} q_y - 4c_U c_Y^{AM} q_x \tag{76}$$

$$\frac{\partial C_{AM}}{\partial q_x} = 8c_N c_Y^{AM} q_x + 8c_U c_Z^{AM} q_x - 4c_E c_Y^{AM} q_y - 4c_E c_Z^{AM} q_z - 4c_N c_X^{AM} q_y + 4c_N c_Z^{AM} q_w - 4c_U c_X^{AM} q_z - 4c_U c_Y^{AM} q_w \tag{77}$$

$$\frac{\partial C_{AM}}{\partial q_y} = 8c_E c_X^{AM} q_y + 8c_U c_Z^{AM} q_y - 4c_E c_Y^{AM} q_x - 4c_E c_Z^{AM} q_w - 4c_N c_X^{AM} q_x - 4c_N c_Z^{AM} q_z + 4c_U c_X^{AM} q_w - 4c_U c_Y^{AM} q_z \tag{78}$$

$$\frac{\partial C_{AM}}{\partial q_z} = 8c_E c_X^{AM} q_Z + 8c_N c_Y^{AM} q_Z + 4c_E c_Y^{AM} q_w - 4c_E c_Z^{AM} q_x - 4c_N c_X^{AM} q_w - 4c_N c_Z^{AM} q_y - 4c_U c_X^{AM} q_x - 4c_U c_Y^{AM} q_y \tag{79}$$

This section describes the numerical solution for the Lagrange formulation. L in Equation (36) is a scalar function whose minimum is sought with respect to five variables $\{q_w\ q_x\ q_y\ q_z\ \lambda\}$ numerically at every time $t_k$ during the estimation process described with reference to FIG. 4:

$$\frac{\partial L}{\partial \tilde{q}(t_k)} = 0 \tag{80}$$

An augmented $\tilde{q}(t_k)$ in Equation (50) defines these variables. The development of the numerical solution is described in this section. Consider a starting solution $\tilde{q}^0(t_k)$ at any time $t_k$. The function L is expanded about this choice using Taylor series expansion as follows:

$$L = L(\tilde{q}^0(t_k)) + \left[\nabla L|_{\tilde{q}(t_k)=\tilde{q}^0(t_k)}\right]^T\left[\tilde{q}(t_k) - \tilde{q}^0(t_k)\right] + \frac{1}{2}\left[\tilde{q}(t_k) - \tilde{q}^0(t_k)\right]^T\left[H|_{\tilde{q}(t_k)=\tilde{q}^0(t_k)}\right]\left[\tilde{q}(t_k) - \tilde{q}^0(t_k)\right] \tag{81}$$

Taking the derivative of Equation (81) yields:

$$\frac{\partial L}{\partial \tilde{q}(t_k)} = \nabla L|_{\tilde{q}(t_k)=\tilde{q}^0(t_k)} + H|_{\tilde{q}(t_k)=\tilde{q}^0(t_k)}\left[\tilde{q}(t_k) - \tilde{q}^0(t_k)\right] \tag{82}$$

From Equations (80) and (82):

$$0 = \nabla L|_{\tilde{q}(t_k)=\tilde{q}^0(t_k)} + H|_{\tilde{q}(t_k)=\tilde{q}^0(t_k)}\left[\tilde{q}(t_k) - \tilde{q}^0(t_k)\right] \tag{83}$$

Or:

$$\tilde{q}(t_k) = \tilde{q}^0(t_k) - \left[H|_{\tilde{q}(t_k)=\tilde{q}^0(t_k)}\right]^{-1}\left[\nabla L|_{\tilde{q}(t_k)=\tilde{q}^0(t_k)}\right] \tag{84}$$

Equation (82) may be applied recursively according to:

$$\tilde{q}^{i+1}(t_k) = \tilde{q}^i(t_k) - \left[H|_{\tilde{q}(t_k)=\tilde{q}^i(t_k)}\right]^{-1}\left[\nabla L|_{\tilde{q}(t_k)=\tilde{q}^i(t_k)}\right] \tag{85}$$

The following section describes implementation details related to the computation of Lagrange function derivatives. Lagrange function derivatives—which may be used in Equation (44) are available in Equations (43) and (66)-(77). The gradient and Hessian components are provided in this section.

For the gyroscope only implementation, the gradient may be:

$$\frac{\partial L}{\partial q_w} = 2\lambda q_w \tag{86}$$

$$\frac{\partial L}{\partial q_x} = 2\lambda q_x \tag{87}$$

$$\frac{\partial L}{\partial q_y} = 2\lambda q_y \tag{88}$$

$$\frac{\partial L}{\partial q_z} = 2\lambda q_z \tag{89}$$

$$\frac{\partial L}{\partial \lambda} = q_w^2 + q_x^2 + q_y^2 + q_z^2 - 1 \tag{90}$$

Row 1 of the Hessian may be:

$$\frac{\partial^2 L}{\partial q_w^2} = 2\lambda \tag{91}$$

$$\frac{\partial^2 L}{\partial q_x \partial q_w} = 0 \tag{92}$$

$$\frac{\partial^2 L}{\partial q_y \partial q_w} = 0 \tag{93}$$

$$\frac{\partial^2 L}{\partial q_z \partial q_w} = 0 \tag{94}$$

$$\frac{\partial^2 L}{\partial \lambda \partial q_w} = 2q_w \tag{95}$$

Row 2 of the Hessian may be:

$$\frac{\partial^2 L}{\partial q_w \partial q_x} = 0 \tag{96}$$

$$\frac{\partial^2 L}{\partial q_x^2} = 2\lambda \tag{97}$$

-continued $$\frac{\partial^2 L}{\partial q_y \partial q_x} = 0 \tag{98}$$

$$\frac{\partial^2 L}{\partial q_z \partial q_x} = 0 \tag{99}$$

$$\frac{\partial^2 L}{\partial \lambda \partial q_x} = 2q_x \tag{100}$$

Row 3 of the Hessian may be:

$$\frac{\partial^2 L}{\partial q_w \partial q_y} = 0 \tag{101}$$

$$\frac{\partial^2 L}{\partial q_x \partial q_y} = 0 \tag{102}$$

$$\frac{\partial^2 L}{\partial q_y^2} = 2\lambda \tag{103}$$

$$\frac{\partial^2 L}{\partial q_z \partial q_y} = 0 \tag{104}$$

$$\frac{\partial^2 L}{\partial \lambda \partial q_y} = 2q_y \tag{105}$$

Row 4 of the Hessian may be:

$$\frac{\partial^2 L}{\partial q_w \partial q_z} = 0 \tag{106}$$

$$\frac{\partial^2 L}{\partial q_x \partial q_z} = 0 \tag{107}$$

$$\frac{\partial^2 L}{\partial q_y \partial q_z} = 0 \tag{108}$$

$$\frac{\partial^2 L}{\partial q_z^2} = 2\lambda \tag{109}$$

$$\frac{\partial^2 L}{\partial \lambda \partial q_z} = 2q_z \tag{110}$$

Row 5 of the Hessian may be:

$$\frac{\partial^2 L}{\partial q_w \partial \lambda} = 2q_w \tag{111}$$

$$\frac{\partial^2 L}{\partial q_x \partial \lambda} = 2q_x \tag{112}$$

$$\frac{\partial^2 L}{\partial q_y \partial \lambda} = 2q_y \tag{113}$$

$$\frac{\partial^2 L}{\partial q_z \partial \lambda} = 2q_z \tag{114}$$

$$\frac{\partial^2 L}{\partial \lambda^2} = 0 \tag{115}$$

For the gyroscope and magnetometer implementation, the gradient may be:

$$\frac{\partial L}{\partial q_w} = 2\lambda q_w + 4m_E m_Y^M q_z - 4m_E m_Z^M q_y - \tag{116}$$

-continued $$4m_N m_X^M q_z + 4m_N m_Z^M q_x + 4m_U m_X^M q_y - 4m_U m_Y^M q_x$$

$$\frac{\partial L}{\partial q_x} = 2\lambda q_x + 8m_N m_Y^M q_x + 8m_U m_Z^M q_x - 4m_E m_Y^M q_y - \tag{117}$$

$$4m_E m_Z^M q_z - 4m_N m_X^M q_y + 4m_N m_Z^M q_w - 4m_U m_X^M q_z - 4m_U m_Y^M q_w$$

$$\frac{\partial L}{\partial q_y} = 2\lambda q_y + 8m_E m_X^M q_y + 8m_U m_Z^M q_y - 4m_E m_Y^M q_x - \tag{118}$$

$$4m_E m_Z^M q_w - 4m_N m_X^M q_x - 4m_N m_Z^M q_z + 4m_U m_X^M q_w - 4m_U m_Y^M q_z$$

$$\frac{\partial L}{\partial q_Z} = 2\lambda q_z + 8m_E m_X^M q_z + 8m_N m_Y^M q_z + 4m_E m_Y^M q_w - \tag{119}$$

$$4m_E m_Z^M q_x - 4m_N m_X^M q_w - 4m_N m_Z^M q_y - 4m_U m_X^M q_x - 4m_U m_Y^M q_y$$

$$\frac{\partial L}{\partial \lambda} = q_w^2 + q_x^2 + q_y^2 + q_z^2 - 1 \tag{120}$$

Row 1 of the Hessian may be:

$$\frac{\partial^2 L}{\partial q_w^2} = 2\lambda \tag{121}$$

$$\frac{\partial^2 L}{\partial q_x \partial q_w} = 4m_N m_Z^M - 4m_U m_Y^M \tag{122}$$

$$\frac{\partial^2 L}{\partial q_y \partial q_w} = -4m_E m_Z^M + 4m_U m_X^M \tag{123}$$

$$\frac{\partial^2 L}{\partial q_z \partial q_w} = 4m_E m_Y^M - 4m_N m_X^M \tag{124}$$

$$\frac{\partial^2 L}{\partial \lambda \partial q_w} = 2q_w \tag{125}$$

Row 2 of the Hessian may be:

$$\frac{\partial^2 L}{\partial q_w \partial q_x} = 4m_N m_Z^M - 4m_U m_Y^M \tag{126}$$

$$\frac{\partial^2 L}{\partial q_x^2} = 2\lambda + 8m_N m_Y^M + 8m_U m_Z^M \tag{127}$$

$$\frac{\partial^2 L}{\partial q_y \partial q_x} = -4m_E m_Y^M - 4m_N m_X^M \tag{128}$$

$$\frac{\partial^2 L}{\partial q_z \partial q_x} = -4m_E m_Z^M - 4m_U m_X^M \tag{129}$$

$$\frac{\partial^2 L}{\partial \lambda \partial q_x} = 2q_x \tag{130}$$

Row 3 of the Hessian may be:

$$\frac{\partial^2 L}{\partial q_w \partial q_y} = -4m_E m_Z^M + 4m_U m_X^M \tag{131}$$

$$\frac{\partial^2 L}{\partial q_x \partial q_y} = -4m_E m_Y^M - 4m_N m_X^M \tag{132}$$

$$\frac{\partial^2 L}{\partial q_y^2} = 2\lambda + 8m_E m_X^M + 8m_U m_Z^M \tag{133}$$

$$\frac{\partial^2 L}{\partial q_z \partial q_y} = -4m_N m_Z^M - 4m_U m_Y^M \tag{134}$$

$$\frac{\partial^2 L}{\partial \lambda \partial q_y} = 2q_y \tag{135}$$

Row 4 of the Hessian may be:

$$\frac{\partial^2 L}{\partial q_w \partial q_z} = 4m_E m_Y^M - 4m_N m_X^M \tag{136}$$

$$\frac{\partial^2 L}{\partial q_x \partial q_z} = -4m_E m_z^M - 4m_U m_X^M \tag{137}$$

$$\frac{\partial^2 L}{\partial q_y \partial q_z} = -4m_N m_z^M - 4m_U m_Y^M \tag{138}$$

$$\frac{\partial^2 L}{\partial q_z^2} = 2\lambda + 8m_E m_X^M + 8m_N m_Y^M \tag{139}$$

$$\frac{\partial^2 L}{\partial \lambda \partial q_z} = 2q_z \tag{140}$$

Row 5 of the Hessian may be:

$$\frac{\partial^2 L}{\partial q_w \partial \lambda} = 2q_w \tag{141}$$

$$\frac{\partial^2 L}{\partial q_x \partial \lambda} = 2q_x \tag{142}$$

$$\frac{\partial^2 L}{\partial q_y \partial \lambda} = 2q_y \tag{143}$$

$$\frac{\partial^2 L}{\partial q_z \partial \lambda} = 2q_z \tag{144}$$

$$\frac{\partial^2 L}{\partial \lambda^2} = 0 \tag{145}$$

For the gyroscope, magnetometer, and accelerometer implementation, the gradient may be:

$$\begin{aligned} \frac{\partial L}{\partial q_w} = {} & 2\lambda q_w + 4m_E m_Y^M q_z - 4m_E m_Z^M q_y - 4m_N m_X^M q_z + \\ & 4m_N m_Z^M q_x + 4m_U m_X^M q_y - 4m_U m_Y^M q_x + 4a_E a_Y^A q_z - \\ & 4a_E a_Z^A q_y - 4a_N a_X^A q_z + 4a_N a_Z^A q_x + 4a_U a_X^A q_y - 4a_U a_Y^A q_x \end{aligned} \tag{146}$$

$$\begin{aligned} \frac{\partial L}{\partial q_x} = {} & 2\lambda q_x + 8m_N m_Y^M q_x + 8m_U m_Z^M q_x - \\ & 4m_E m_Y^M q_y - 4m_E m_Z^M q_z - 4m_N m_X^M q_y + 4m_N m_Z^M q_w - \\ & 4m_U m_X^M q_z - 4m_U m_Y^M q_w + 8a_N a_Y^A q_x + 8a_U a_Z^A q_x - 4a_E a_Y^A q_y - \\ & 4a_E a_Z^A q_z - 4a_N a_X^A q_y + 4a_N a_Z^A q_w - 4a_U a_X^A q_z - 4a_U a_Y^A q_w \end{aligned} \tag{147}$$

$$\begin{aligned} \frac{\partial L}{\partial q_y} = {} & 2\lambda q_y + 8m_E m_X^M q_y + 8m_U m_Z^M q_y - \\ & 4m_E m_Y^M q_x - 4m_E m_Z^M q_w - 4m_N m_X^M q_x - 4m_N m_Z^M q_z + \\ & 4m_U m_X^M q_w - 4m_U m_Y^M q_z 8a_E a_X^A q_y + 8a_U a_Z^A q_y - 4a_E a_Y^A q_x - \\ & 4a_E a_Z^A q_w - 4a_N a_X^A q_x - 4a_N a_Z^A q_z + 4a_U a_X^A q_w - 4a_U a_Y^A q_z \end{aligned} \tag{148}$$

$$\begin{aligned} \frac{\partial L}{\partial q_Z} = {} & 2\lambda q_z + 8m_E m_X^M q_z + 8m_N m_Y^M q_z + \\ & 4m_E m_Y^M q_w - 4m_E m_Z^M q_x - 4m_N m_X^M q_w - 4m_N m_Z^M q_y - \\ & 4m_U m_X^M q_x - 4m_U m_Y^M q_y 8a_E a_X^A q_z + 8a_N a_Y^A q_z + 4a_E a_Y^A q_w - \\ & 4a_E a_Z^A q_x - 4a_N a_X^A q_w - 4a_N a_Z^A q_y - 4a_U a_X^A q_x - 4a_U a_Y^A q_y \end{aligned} \tag{149}$$

$$\frac{\partial L}{\partial \lambda} = q_w^2 + q_x^2 + q_{y^2} + q_z^2 - 1 \tag{150}$$

Row 1 of the Hessian may be:

$$\frac{\partial^2 L}{\partial q_w^2} = 2\lambda \tag{151}$$

$$\frac{\partial^2 L}{\partial q_x \partial q_w} = 4m_N m_Z^M - 4m_U m_Y^M + 4a_N a_Z^A - 4a_U a_Y^A \tag{152}$$

$$\frac{\partial^2 L}{\partial q_y \partial q_w} = -4m_E m_Z^M + 4m_U m_X^M - 4a_E a_Z^A + 4a_U a_X^A \tag{153}$$

$$\frac{\partial^2 L}{\partial q_Z \partial q_w} = 4m_E m_Y^M - 4m_N m_X^M + 4a_E a_Y^A - 4a_N a_X^A \tag{154}$$

$$\frac{\partial^2 L}{\partial \lambda \partial q_w} = 2q_w \tag{155}$$

Row 2 of the Hessian may be:

$$\frac{\partial^2 L}{\partial q_w \partial q_x} = 4m_N m_Z^M - 4m_U m_Y^M + 4a_N a_Z^A - 4a_U a_Y^A \tag{156}$$

$$\frac{\partial^2 L}{\partial q_x^2} = 2\lambda + 8m_N m_Y^M + 8m_U m_Z^M + 8a_N a_Y^A + 8a_U a_Z^A \tag{157}$$

$$\frac{\partial^2 L}{\partial q_y \partial q_x} = -4m_E m_Y^M - 4m_N m_X^M - 4a_E a_Y^A - 4a_N a_X^A \tag{158}$$

$$\frac{\partial^2 L}{\partial q_Z \partial q_x} = -4m_E m_Z^M - 4m_U m_X^M - 4a_E a_Z^A - 4a_U a_X^A \tag{159}$$

$$\frac{\partial^2 L}{\partial \lambda \partial q_x} = 2q_x \tag{160}$$

Row 3 of the Hessian may be:

$$\frac{\partial^2 L}{\partial q_w \partial q_y} = -4m_E m_Z^M + 4m_U m_X^M - 4a_E a_Z^A + 4a_U a_X^A \tag{161}$$

$$\frac{\partial^2 L}{\partial q_x \partial q_y} = -4m_E m_Y^M - 4m_N m_X^M - 4a_E a_Y^A - 4a_N a_X^A \tag{162}$$

$$\frac{\partial^2 L}{\partial q_y^2} = 2\lambda + 8m_E m_X^M + 8m_U m_Z^M + 8a_E a_X^A + 8a_U a_Z^A \tag{163}$$

$$\frac{\partial^2 L}{\partial q_z \partial q_y} = -4m_N m_Z^M - 4m_U m_Y^M - 4a_N a_Z^A - 4a_U a_Y^A \tag{164}$$

$$\frac{\partial^2 L}{\partial \lambda \partial q_y} = 2q_y \tag{165}$$

Row 4 of the Hessian may be:

$$\frac{\partial^2 L}{\partial q_w \partial q_z} = 4m_E m_Y^M - 4m_N m_X^M + 4a_E a_Y^A - 4a_N a_X^A \tag{166}$$

$$\frac{\partial^2 L}{\partial q_x \partial q_z} = -4m_E m_Z^M - 4m_U m_X^M - 4a_E a_Z^A - 4a_U a_X^A \tag{167}$$

$$\frac{\partial^2 L}{\partial q_y \partial q_z} = -4m_N m_Z^M - 4m_U m_Y^M - 4a_N a_Z^A - 4a_U a_Y^A \tag{168}$$

$$\frac{\partial^2 L}{\partial q_z^2} = 2\lambda + 8m_E m_X^M + 8m_N m_Y^M + 8a_E a_X^A + 8a_N a_Y^A \tag{169}$$

$$\frac{\partial^2 L}{\partial \lambda \partial q_z} = 2q_z \tag{170}$$

Row 5 of the Hessian may be:

$$\frac{\partial^2 L}{\partial q_w \partial \lambda} = 2q_w \tag{171}$$

$$\frac{\partial^2 L}{\partial q_x \partial \lambda} = 2q_x \tag{172}$$

$$\frac{\partial^2 L}{\partial q_y \partial \lambda} = 2q_y \tag{173}$$

$$\frac{\partial^2 L}{\partial q_z \partial \lambda} = 2q_z \tag{174}$$

$$\frac{\partial^2 L}{\partial \lambda^2} = 0 \tag{175}$$

For the gyroscope, magnetometer, accelerometer, and cross-product implementation, the gradient may be:

$$\begin{aligned}\frac{\partial L}{\partial q_w} = {} & 2\lambda q_w + 4m_E m_Y^M q_z - 4m_E m_Z^M q_y - 4m_N m_X^M q_z + 4m_N m_Z^M q_x \\ & + 4m_U m_X^M q_y - 4m_U m_Y^M q_x + 4a_E a_Y^A q_z - 4a_E a_Z^A q_y \\ & - 4a_N a_X^A q_z + 4a_N a_Z^A q_x + 4a_U a_X^A q_y - 4a_U a_Y^A q_x + 4c_E c_Y^{AM} q_z \\ & - 4c_E c_Z^{AM} q_y - 4c_N c_X^{AM} q_z + 4c_N c_Z^{AM} q_x + 4c_U c_X^{AM} q_y \\ & - 4c_U c_Y^{AM} q_x\end{aligned} \tag{176}$$

$$\begin{aligned}\frac{\partial L}{\partial q_x} = {} & 2\lambda q_x + 8m_N m_Y^M q_x + 8m_U m_Z^M q_x - 4m_E m_Y^M q_y - 4m_E m_Z^M q_z \\ & - 4m_N m_X^M q_y + 4m_N m_Z^M q_w - 4m_U m_X^M q_z - 4m_U m_Y^M q_w \\ & + 8a_N a_Y^A q_x + 8a_U a_Z^A q_x - 4a_E a_Y^A q_y - 4a_E a_Z^A q_z - 4a_N a_X^A q_y \\ & + 4a_N a_Z^A q_w - 4a_U a_X^A q_z - 4a_U a_Y^A q_w + 8c_N c_Y^{AM} q_x \\ & + 8c_U c_Z^{AM} q_x - 4c_E c_Y^{AM} q_y - 4c_E c_Z^{AM} q_z - 4c_N c_X^{AM} q_y \\ & + 4c_N c_Z^{AM} q_w - 4c_U c_X^{AM} q_z - 4c_U c_Y^{AM} q_w\end{aligned} \tag{177}$$

$$\begin{aligned}\frac{\partial L}{\partial q_y} = {} & 2\lambda q_y = +8m_E m_X^M q_y + 8m_U m_Z^M q_y - 4m_E m_Y^M q_x - 4m_E m_Z^M q_w \\ & - 4m_N m_X^M q_x - 4m_N m_Z^M q_z + 4m_U m_X^M q_w - 4m_U m_Y^M q_z \\ & + 8a_E a_X^A q_y + 8a_U a_Z^A q_y - 4a_E a_Y^A q_x - 4a_E a_Z^A q_w - 4a_N a_X^A q_x \\ & - 4a_N a_Z^A q_z + 4a_U a_X^A q_w - 4a_U a_Y^A q_z + 8c_E c_X^{AM} q_y \\ & + 8c_U c_Z^{AM} q_y - 4c_E c_Y^{AM} q_x - 4c_E c_Z^{AM} q_w - 4c_N c_X^{AM} q_x \\ & - 4c_N c_Z^{AM} q_z + 4c_U c_X^{AM} q_w - 4c_U c_Y^{AM} q_z\end{aligned} \tag{178}$$

$$\begin{aligned}\frac{\partial L}{\partial q_z} = {} & 2\lambda q_Z + 8m_E m_X^M q_z + 8m_N m_Y^M q_z + 4m_E m_Y^M q_w - 4m_E m_Z^M q_x \\ & - 4m_N m_X^M q_w - 4m_N m_Z^M q_y - 4m_U m_X^M q_x - 4m_U m_Y^M q_y \\ & + 8a_E a_X^A q_z + 8a_N a_Y^A q_z + 4a_E a_Y^A q_w - 4a_E a_Z^A q_x - 4a_N a_X^A q_w \\ & - 4a_N a_Z^A q_y - 4a_U a_X^A q_x - 4a_U a_Y^A q_y + 8c_E c_X^{AM} q_z + 8c_N c_Y^{AM} q_z \\ & + 4c_E c_Y^{AM} q_w - 4c_E c_Z^{AM} q_x - 4c_N c_X^{AM} q_w - 4c_N c_Z^{AM} q_y \\ & - 4c_U c_X^{AM} q_x - 4c_U c_Y^{AM} q_y\end{aligned} \tag{179}$$

$$\frac{\partial L}{\partial \lambda} = q_w^2 + q_x^2 + q_y^2 + q_z^2 - 1 \tag{180}$$

Row 1 of the Hessian may be:

$$\frac{\partial^2 L}{\partial q_w^2} = 2\lambda \tag{181}$$

$$\frac{\partial^2 L}{\partial q_x \partial q_w} = 4m_N m_Z^M - 4m_U m_Y^M + 4a_N a_Z^A - 4a_U a_Y^A + 4c_N c_Z^{AM} - 4c_U c_Y^{AM} \tag{182}$$

$$\frac{\partial^2 L}{\partial q_y \partial q_w} = -4m_E m_Z^M + 4m_U m_X^M - 4a_E a_Z^A + 4a_U a_X^A - 4c_E c_Z^{AM} + 4c_U c_X^{AM} \tag{183}$$

$$\frac{\partial^2 L}{\partial q_z \partial q_w} = 4m_E m_Y^M - 4m_N m_X^M + 4a_E a_Y^A - 4a_N a_X^A + 4c_E c_Y^{AM} - 4c_N c_X^{AM} \tag{184}$$

-continued $$\frac{\partial^2 L}{\partial\lambda\partial q_w} = 2q_w \tag{185}$$

Row 2 of the Hessian may be:

$$\frac{\partial^2 L}{\partial q_w\partial q_x} = 4m_N m_Z^M - 4m_U m_Y^M + 4a_N a_Z^A - 4a_U a_Y^A + 4c_N c_Z^{AM} - 4c_U c_Y^{AM} \tag{186}$$

$$\frac{\partial^2 L}{\partial q_x^2} = 2\lambda + 8m_N m_Y^M + 8m_U m_Z^M + 8a_N a_Y^A + 8a_U a_Z^A + 8c_N c_Y^{AM} + 8c_U c_Z^{AM} \tag{187}$$

$$\frac{\partial^2 L}{\partial q_y\partial q_x} = -4m_E m_Y^M - 4m_N m_X^M - 4a_E a_Y^A - 4a_N a_X^A - 4c_E c_Y^{AM} - 4c_N c_X^{AM} \tag{188}$$

$$\frac{\partial^2 L}{\partial q_z\partial q_x} = -4m_E m_Z^M - 4m_U m_X^M - 4a_E a_Z^A - 4a_U a_X^A - 4c_E c_Z^{AM} - 4c_U c_X^{AM} \tag{189}$$

$$\frac{\partial^2 L}{\partial\lambda\partial q_x} = 2q_x \tag{190}$$

Row 3 of the Hessian may be:

$$\frac{\partial^2 L}{\partial q_w\partial q_y} = -4m_E m_Z^M + 4m_U m_X^M - 4a_E a_Z^A + 4a_U a_X^A - 4c_E c_Z^{AM} + 4c_U c_X^{AM} \tag{191}$$

$$\frac{\partial^2 L}{\partial q_x\partial q_y} = -4m_E m_Y^M - 4m_N m_X^M - 4a_E a_Y^A - 4a_N a_X^A - 4c_E c_Y^{AM} - 4c_N c_X^{AM} \tag{192}$$

$$\frac{\partial^2 L}{\partial q_y^2} = 2\lambda + 8m_E m_X^M + 8m_U m_Z^M + 8a_E a_X^A + 8a_U a_Z^A + 8c_E c_X^{AM} + 8c_U c_Z^{AM} \tag{193}$$

$$\frac{\partial^2 L}{\partial q_z\partial q_y} = -4m_N m_Z^M - 4m_U m_Y^M - 4a_N a_Z^A - 4a_U a_Y^A - 4c_N c_Z^{AM} - 4c_U c_Y^{AM} \tag{194}$$

$$\frac{\partial^2 L}{\partial\lambda\partial q_y} = 2q_y \tag{195}$$

Row 4 of the Hessian may be:

$$\frac{\partial^2 L}{\partial q_w\partial q_z} = 4m_E m_Y^M - 4m_N m_X^M + 4a_E a_Y^A - 4a_N a_X^A + 4c_E c_Y^{AM} - 4c_N c_X^{AM} \tag{196}$$

$$\frac{\partial^2 L}{\partial q_x\partial q_z} = -4m_E m_Z^M - 4m_U m_X^M - 4a_E a_Z^A - 4a_U a_X^A - 4c_E c_Z^{AM} - 4c_U c_X^{AM} \tag{197}$$

$$\frac{\partial^2 L}{\partial q_y\partial q_z} = -4m_N m_Z^M - 4m_U m_Y^M - 4a_N a_Z^A - 4a_U a_Y^A - 4c_N c_Z^{AM} - 4c_U c_Y^{AM} \tag{198}$$

-continued $$\frac{\partial^2 L}{\partial q_z^2} = 2\lambda + 8m_E m_X^M + 8m_N m_Y^M + 8a_E a_X^A + 8a_N a_Y^A + 8c_E c_X^{AM} + 8c_N c_Y^{AM} \tag{199}$$

$$\frac{\partial^2 L}{\partial\lambda\partial q_z} = 2q_z \tag{200}$$

Row 5 of the Hessian may be:

$$\frac{\partial^2 L}{\partial q_w\partial\lambda} = 2q_w \tag{201}$$

$$\frac{\partial^2 L}{\partial q_x\partial\lambda} = 2q_x \tag{202}$$

$$\frac{\partial^2 L}{\partial q_y\partial\lambda} = 2q_y \tag{203}$$

$$\frac{\partial^2 L}{\partial q_z\partial\lambda} = 2q_z \tag{204}$$

$$\frac{\partial^2 L}{\partial\lambda^2} = 0 \tag{205}$$

The foregoing description is merely illustrative in nature and does not limit the scope of the disclosure or its applications. The broad teachings of the disclosure may be implemented in many different ways. While the disclosure includes some particular examples, other modifications will become apparent upon a study of the drawings, the text of this specification, and the following claims. In the written description and the claims, one or more processes within any given method may be executed in a different order—or processes may be executed concurrently or in combination with each other—without altering the principles of this disclosure. Similarly, instructions stored in a non-transitory computer-readable medium may be executed in a different order—or concurrently—without altering the principles of this disclosure. Unless otherwise indicated, the numbering or other labeling of instructions or method steps is done for convenient reference and does not necessarily indicate a fixed sequencing or ordering.

It should also be noted that a plurality of hardware and software-based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software-based devices, as well as a plurality of different structural components may be utilized to implement the invention. For example, "control units" and "controllers" described in the specification can include one or more electronic processors, one or more memories including a non-transitory computer-readable medium, one or more input/output interfaces, and various connections (for example, a system bus) connecting the components.

Unless the context of their usage unambiguously indicates otherwise, the articles "a," "an," and "the" should not be interpreted to mean "only one." Rather, these articles should be interpreted to mean "at least one" or "one or more."

Likewise, when the terms "the" or "said" are used to refer to a noun previously introduced by the indefinite article "a" or "an," the terms "the" or "said" should similarly be interpreted to mean "at least one" or "one or more" unless the context of their usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable connections or links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations collectively. To reiterate, those electronic processors and processing may be distributed.

Spatial and functional relationships between elements—such as modules—are described using terms such as (but not limited to) "connected," "engaged," "interfaced," and/or "coupled." Unless explicitly described as being "direct," relationships between elements may be direct or include intervening elements. The phrase "at least one of A, B, and C" should be construed to indicate a logical relationship (A OR B OR C), where OR is a non-exclusive logical OR, and should not be construed to mean "at least one of A, at least one of B, and at least one of C." The term "set" does not necessarily exclude the empty set. For example, the term "set" may have zero elements. The term "subset" does not necessarily require a proper subset. For example, a "subset" of set A may be coextensive with set A, or include elements of set A. Furthermore, the term "subset" does not necessarily exclude the empty set.

In the figures, the directions of arrows generally demonstrate the flow of information—such as data or instructions. The direction of an arrow does not imply that information is not being transmitted in the reverse direction. For example, when information is sent from a first element to a second element, the arrow may point from the first element to the second element. However, the second element may send requests for data to the first element, and/or acknowledgements of receipt of information to the first element. Furthermore, while the figures illustrate a number of components and/or steps, any one or more of the components and/or steps may be omitted or duplicated, as suitable for the application and setting.

Additionally, operations (such as processes, decisions, inputs, outputs, actions, messages, interactions, events, and/or any other operations) shown in the flowcharts and/or message sequence charts may be illustrated once each and in a particular order in the drawings. However, in various implementations, the operations may be reordered and/or repeated as may be suitable. In some examples, different operations may be performed in parallel, as may be appropriate.

The term computer-readable medium does not encompass transitory electrical or electromagnetic signals or electromagnetic signals propagating through a medium—such as on an electromagnetic carrier wave. The term "computer-readable medium" is considered tangible and non-transitory. The functional blocks, flowchart elements, and message sequence charts described above serve as software specifications that can be translated into computer programs by the routine work of a skilled technician or programmer.

What is claimed is:

1. A system, comprising:

a first sensor coupled to a body, the first sensor having a first modality;

a second sensor coupled to the body, the second sensor having a second modality, the second modality being different from the first modality;

non-transitory computer-readable storage media storing instructions; and an electronic processor configured to execute the instructions to:

initialize a state model, the state model including (i) linear components representing an instantaneous rate of rotation of the body and (ii) quaternion components representing a current orientation of the body, apply a linear state estimator to the linear components of the state model based on first sensor signals from the first sensor to determine an estimated angular velocity of the body, apply a kinematic model to the quaternion components of the state model to determine an estimated quaternion, the estimated quaternion representing an orientation of the body in a body frame, compute a transformation matrix based on the estimated quaternion, the transformation matrix being usable to transform representations from the body frame to a navigation frame, determine a modality-specific measurement based on second sensor signals from the second sensor, transform the modality-specific measurement from the body frame into the navigation frame using the transformation matrix, compute an error between the transformed modality-specific measurement and a reference measurement, the reference measurement being in the navigation frame, and correct the estimated quaternion to minimize the error, the corrected quaternion representing a corrected orientation of the body.

2. The system of claim 1, wherein the linear state estimator is a Linear Kalman Filter.

3. The system of claim 1, wherein the kinematic model includes integrating a differential equation of the quaternion components using the estimated angular velocity.

4. The system of claim 1, wherein the linear components of the state model represent instantaneous rates of rotation in three axes of the body.

5. The system of claim 1, wherein the first sensor includes a gyroscope.

6. The system of claim 1, wherein:

the second sensor includes a magnetometer;

the modality-specific measurement includes a magnetic field vector; and the reference measurement includes a reference magnetic field vector in the navigation frame.

7. The system of claim 1, wherein:

the second sensor includes an accelerometer;

the modality-specific measurement includes a gravity vector; and the reference measurement includes a reference gravity vector in the navigation frame.

8. A system, comprising:

a first sensor coupled to a body, the first sensor having a first modality;

a second sensor coupled to the body, the second sensor having a second modality, the second modality being different from the first modality;

a third sensor coupled to the body, the third sensor having a third modality, the third modality being different from the first modality and the second modality;

non-transitory computer-readable storage media storing instructions; and an electronic processor configured to execute the instructions to:

initialize a state model, the state model including (i) linear components representing an instantaneous rate of rotation of the body and (ii) quaternion components representing a current orientation of the body, apply a linear state estimator to the linear components of the state model based on first sensor signals from the first sensor to determine an estimated angular velocity of the body, apply a kinematic model to the quaternion components of the state model to determine an estimated quaternion, the estimated quaternion representing an orientation of the body in a body frame, compute a transformation matrix based on the estimated quaternion, the transformation matrix being usable to transform representations from the body frame to a navigation frame, determine a first modality-specific measurement based on second sensor signals from the second sensor, determine a second modality-specific measurement based on third sensor signals from the third sensor, compute a cross-product of the first modality-specific measurement and the second modality-specific measurement, transform the cross-product of the first modality-specific measurement and the second modality-specific measurement from the body frame into the navigation frame using the transformation matrix, compute a reference cross-product of a first reference measurement and a second reference measurement, the first reference measurement and the second reference measurement being in the navigation frame, compute an error between the transformed cross-product and the reference cross-product, and correct the estimated quaternion to minimize the error, the corrected quaternion representing a corrected orientation of the body.

9. The system of claim 8, wherein the linear state estimator is a Linear Kalman Filter.

10. The system of claim 8, wherein the kinematic model includes integrating a differential equation of the quaternion components using the estimated angular velocity.

11. The system of claim 8, wherein the linear components of the state model represent instantaneous rates of rotation in three axes of the body.

12. The system of claim 8, wherein the first sensor includes a gyroscope.

13. The system of claim 8, wherein:

the second sensor includes a magnetometer;

the first modality-specific measurement includes a magnetic field vector; and the first reference measurement includes a reference magnetic field vector in the navigation frame.

14. The system of claim 8, wherein:

the third sensor includes an accelerometer;

the second modality-specific measurement includes a gravity vector; and the second reference measurement includes a reference gravity vector in the navigation frame.

15. A method, comprising:

initializing, at a sensor platform, a state model, the state model including (i) linear components representing an instantaneous rate of rotation of the sensor platform and (ii) quaternion components representing a current orientation of the sensor platform, applying, at the sensor platform, a linear state estimator to the linear components of the state model based on first sensor signals from a first sensor to determine an estimated angular velocity of the sensor platform, the first sensor being coupled to the sensor platform, the first sensor having a first modality;

applying, at the sensor platform, a kinematic model to the quaternion components of the state model to determine an estimated quaternion, the estimated quaternion representing an orientation of the sensor platform in a body frame;

computing, at the sensor platform, a transformation matrix based on the estimated quaternion, the transformation matrix being usable to transform representations from the body frame to a navigation frame;

computing, at the sensor platform, a modality-specific measurement based on second sensor signals from a second sensor, the second sensor being coupled to the sensor platform, the second sensor having a second modality different from the first sensor;

transforming, at the sensor platform, the modality-specific measurement from the body frame into the navigation frame using the transformation matrix;

computing, at the sensor platform, an error between the transformed modality-specific measurement and a reference measurement, the reference measurement being in the navigation frame; and correcting, at the sensor platform, the estimated quaternion to minimize the error, the corrected quaternion representing a corrected orientation of the sensor platform.

16. The method of claim 15, wherein:

the linear state estimator is a Linear Kalman Filter;

the kinematic model includes integrating a differential equation of the quaternion components using the estimated angular velocity; and the linear components of the state model represent instantaneous rates of rotation in three axes of the body.

17. The method of claim 15, wherein the first sensor includes a gyroscope.

18. The method of claim 15, wherein:

the second sensor includes a magnetometer;

the modality-specific measurement includes a magnetic field vector; and the reference measurement includes a reference magnetic field vector in the navigation frame.

19. The method of claim 15, wherein:

the second sensor includes an accelerometer;

the modality-specific measurement includes a gravity vector; and the reference measurement includes a reference gravity vector in the navigation frame.

20. A non-transitory computer-readable storage medium comprising executable instructions that, when executed by an electronic processor, causes the electronic processor to perform the method of claim 15.

* * * * *